United States Patent
Delaney et al.

(10) Patent No.: US 12,238,072 B1
(45) Date of Patent: *Feb. 25, 2025

(54) SECURE COMMUNICATIONS TO MULTIPLE DEVICES AND MULTIPLE PARTIES USING PHYSICAL AND VIRTUAL KEY STORAGE

(71) Applicant: Cyber IP Holdings, LLC, Herndon, VA (US)

(72) Inventors: Christopher Edward Delaney, Front Royal, VA (US); Chava Louis Jurado, Leesburg, VA (US); Carl Bailey Jacobs, Fredericksburg, VA (US); Jeremiah MacDonald, Greenville, SC (US); Michael Vincent Chest, Taylors, SC (US); Walter Adeyinka Ademiluyi, Boyds, MD (US)

(73) Assignee: Cyber IP Holdings, LLC, Herndon, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/538,056

(22) Filed: Dec. 13, 2023

Related U.S. Application Data

(63) Continuation of application No. 18/160,502, filed on Jan. 27, 2023, now Pat. No. 11,888,822, which is a continuation of application No. 16/578,547, filed on Sep. 23, 2019, now Pat. No. 11,601,402, which is a continuation-in-part of application No. 16/401,498, filed on May 2, 2019, now Pat. No. 11,349,646.

(60) Provisional application No. 62/666,424, filed on May 3, 2018.

(51) Int. Cl.
 H04L 9/40 (2022.01)
 G06F 9/451 (2018.01)
 H04L 9/08 (2006.01)
 H04L 9/32 (2006.01)

(52) U.S. Cl.
 CPC .......... *H04L 63/0281* (2013.01); *G06F 9/452* (2018.02); *H04L 9/0863* (2013.01); *H04L 9/3268* (2013.01); *H04L 63/0428* (2013.01)

(58) Field of Classification Search
 CPC . H04L 63/0281; H04L 9/0863; H04L 9/3268; H04L 63/0428; G06F 9/452
 USPC ....................................................... 713/153
 See application file for complete search history.

(56) References Cited

U.S. PATENT DOCUMENTS 6,981,141 B1* 12/2005 Mahne ................. G06F 21/602
                                                713/165
9,461,971 B1* 10/2016 Wise .................... H04W 12/037
9,800,517 B1* 10/2017 Anderson ............ H04L 63/0428
(Continued)

*Primary Examiner* — Thanh T Le
(74) *Attorney, Agent, or Firm* — Jones Day

(57) ABSTRACT

Secure communications can be established in which a request is received from a client computing device to instantiate a virtual key store (VKS) node. In response to the request, a cryptographically calculated uniform resource locator (URL) is generated. In addition, a crytopgraphic identity certificate is received from a certification authority server. Subsequently, a virtual desktop infrastructure (VDI) instance is instantiated and configured with the cryptographic identity certificate. Communications are then established between the client computing device and the VDI instance using the generated cryptographically calculated URL such that the VDI instance acts as a cryptographic proxy with at least one remote computing device.

20 Claims, 25 Drawing Sheets

(56) References Cited

U.S. PATENT DOCUMENTS

| | | | | |
|---|---|---|---|---|
| 10,152,211 | B2* | 12/2018 | Koushik | H04L 63/10 |
| 10,182,103 | B2* | 1/2019 | Koushik | H04L 67/562 |
| 10,445,794 | B1* | 10/2019 | Krishnamurthy | G06Q 50/01 |
| 10,460,098 | B1* | 10/2019 | Wang | H04L 63/0838 |
| 10,530,578 | B2* | 1/2020 | Keshava | G06F 12/1466 |
| 10,592,678 | B1* | 3/2020 | Ismael | G06F 21/62 |
| 2002/0032738 | A1* | 3/2002 | Foulger | G06Q 10/107 709/206 |
| 2004/0030887 | A1* | 2/2004 | Harrisville-Wolff | H04L 63/08 713/155 |
| 2011/0125771 | A1* | 5/2011 | Gladwin | G06F 3/0619 709/219 |
| 2011/0185398 | A1* | 7/2011 | Kubota | G06F 21/41 726/3 |
| 2012/0072237 | A1* | 3/2012 | Campbell | G16H 10/60 705/3 |
| 2012/0179820 | A1* | 7/2012 | Ringdahl | H04L 63/102 709/225 |
| 2013/0091352 | A1* | 4/2013 | Patel | H04L 63/0428 713/175 |
| 2013/0163758 | A1* | 6/2013 | Swaminathan | H04L 9/08 380/259 |
| 2014/0013103 | A1* | 1/2014 | Giladi | H04L 63/0428 713/150 |
| 2014/0082350 | A1* | 3/2014 | Zarfoss, III | H04L 63/083 713/155 |
| 2014/0122866 | A1* | 5/2014 | Haeger | H04L 63/0471 713/153 |
| 2014/0215210 | A1* | 7/2014 | Wang | H04L 63/0428 713/165 |
| 2015/0046325 | A1* | 2/2015 | McCracken | G06F 9/452 705/43 |
| 2015/0067805 | A1* | 3/2015 | Martin | H04L 67/1095 726/7 |
| 2015/0089233 | A1* | 3/2015 | Roth | H04L 9/321 713/168 |
| 2015/0134962 | A1* | 5/2015 | Mahajan | H04L 63/061 713/171 |
| 2015/0381588 | A1* | 12/2015 | Huang | G06F 21/6218 713/153 |
| 2016/0099922 | A1* | 4/2016 | Dover | H04L 9/0822 713/171 |
| 2016/0316025 | A1* | 10/2016 | Lloyd | H04L 65/1069 |
| 2017/0103227 | A1* | 4/2017 | Kerschbaum | H04L 9/008 |
| 2017/0126642 | A1* | 5/2017 | Basin | H04L 9/302 |
| 2017/0177883 | A1* | 6/2017 | Paterra | G06F 21/44 |
| 2017/0222981 | A1* | 8/2017 | Srivastav | H04L 63/0428 |
| 2019/0050242 | A1* | 2/2019 | Raffaele | G06F 9/45558 |
| 2019/0297499 | A1* | 9/2019 | Hawkes | H04W 12/40 |
| 2019/0303212 | A1* | 10/2019 | Bosch | H04L 67/1097 |
| 2019/0364047 | A1* | 11/2019 | Awate | H04L 63/20 |
| 2020/0004983 | A1* | 1/2020 | Chen | H04L 67/1095 |
| 2020/0029209 | A1* | 1/2020 | Nölscher | H04W 12/069 |
| 2020/0050467 | A1* | 2/2020 | Dobson | G06V 30/416 |
| 2020/0204372 | A1* | 6/2020 | Ngo | H04L 9/3252 |
| 2020/0280547 | A1* | 9/2020 | Rawalkshatriya | H04L 9/0891 |
| 2020/0371829 | A1* | 11/2020 | Momchilov | G06F 9/452 |
| 2020/0374351 | A1* | 11/2020 | Momchilov | G06F 9/5077 |

\* cited by examiner

SECURE COMMUNICATIONS TO MULTIPLE DEVICES AND MULTIPLE PARTIES USING PHYSICAL AND VIRTUAL KEY STORAGE

CROSS-REFERENCE TO RELATED APPLICATIONS

This application is a continuation of U.S. application Ser. No. 18/160,502, filed Jan. 27, 2023, which is a continuation of U.S. application Ser. No. 16/578,547, filed Sep. 23, 2019, which claims priority to and is a continuation-in-part of U.S. patent application Ser. No. 16/401,498 filed on May 2, 2019, which, in turn, claims priority to U.S. Provisional Application No. 62/666,424, filed May 3, 2018, all of which are incorporated herein by reference in their entireties.

TECHNICAL FIELD

The technology described herein relates to secure communications and more particularly to secure communications channels between users.

BACKGROUND

Private key cryptography that uses Diffie-Hellman (DH)-style or RSA-style key exchange to secure and validate person-to-person communications, has been available since 1991, i.e., Pretty Good Privacy (PGP). A free software implementation of private key cryptography, i.e., GNU Privacy Guard (GPG), has been freely accessible to anyone with a computer since 1999.

Public-key encryption that uses DH/RSA-style key exchange to share public keys can be used to secure one-time or ongoing communications between two parties across a monitored network, without risk of being compromised. This method of encryption is employed within modern standards such as HyperText Transfer Protocol/Secure (HTTPS), which secures the communications channel between a user and a server, and can even guarantee the identity of the server to the user.

Despite its advantages, encryption of this type has shown minimal adoption in person-to-person communications and person-to-group communications. Many of the solutions that do make use of private key infrastructure (PKI) do so only between individual users and servers, such that communications that traverse the internet are secure from eavesdropping, but the encryption is "broken" at the server. If such a server is compromised either via an unauthorized access, or via malfeasance by an authorized administrator, any communications that crosses or has crossed that server may be leaked to third parties. Further, services such as DropBox, which purport to protect user data through encryption, suffer the weakness that the service provider, rather than the user, owns and retains the encryption keys. In the case of a breach at the provider, the user's information is at risk of compromise and dissemination.

SUMMARY

A method for automatically disseminating a private key is presented. A first message requesting a key proxy instance is received from a first user device. The first message is signed and encrypted and comprises a first symmetric key. A key proxy server is directed to allocate a key proxy instance for communication with the first user device based on a first device public key that corresponds to the first user device. A unique URL corresponding to the key proxy instance is received from the key proxy server. A second message comprising the unique URL is sent to the first user device. The second message is encrypted using the first symmetric key and signed using a server private key. A third message comprising the URL of the key proxy instance is received from the first user device and forwarded to a second user device. The third message is encrypted using a second symmetric key generated by the first user device and signed using a first device private key that corresponds to the first user device.

In an interrelated aspect, a system for automatically disseminating a private key is presented. The system comprises a first user device, a second user device, and a server comprising one or more data processors having memory storing instructions. The memory storing instructions execute the steps of a method. In that method, a first message requesting a key proxy instance is received from a first user device. The first message comprises a first symmetric key. A key proxy server is directed to allocate a key proxy instance for communication with the first user device based on a first device public key that corresponds to the first user device. A unique URL corresponding to the key proxy instance is received from the key proxy server. A second message comprising the unique URL is sent to the first user device. The second message is encrypted using the first symmetric key and signed using a server private key. A third message comprising the URL of the key proxy instance is received from the first user device and forwarded to a second user device. The third message is encrypted using a second symmetric key generated by the first user device and signed using a first device private key that corresponds to the first user device.

In a further interrelated aspect, a method for facilitating communication between users is presented. A first encrypted signed message requesting a user public key of a receiving user is received from a first user device. The user public key is associated with a first cryptographic hash of a combined string. The combined string comprises a user ID and a service name. Whether the first cryptographic hash exists in storage is determined. A second encrypted signed message comprising the user public key associated with the first cryptographic hash is sent based on the determining. A message comprising (i) a symmetric key encrypted with the user public key; (ii) a second cryptographic hash of the user public key; and (iii) user-supplied content is received. A list of authorized devices for the receiving user is determined. The message is forwarded, without decrypting, to a second user device. The second user device is associated with the receiving user and appears in the list of authorized devices.

In yet a further interrelated aspect, a method for establishing secure communications is presented. A request is received from a client computing device to instantiate a virtual key store (VKS) node. In response to the request, a cryptographically calculated uniform resource locator (URL) is generated. In addition, a crytopgraphic identity certificate is received from a certification authority server. Subsequently, a virtual desktop infrastructure (VDI) instance is instantiated and configured with the cryptographic identity certificate. Communications are then established between the client computing device and the VDI instance using the generated cryptographically calculated URL such that the VDI instance acts as a cryptographic proxy with at least one remote computing device.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

DETAILED DESCRIPTION

A lack of adoption for PKI-based data protection can be attributed to the fact that it can be cumbersome to use. In order to communicate with another person via PKI, a user generates his/her own public key and private key pair, storing the private key in a manner that ensures its safety and integrity. Then the user either shares his/her public key with another user or obtains the other user's public key. The public keys are managed in a data store that is commonly called a key ring. If the user wishes to use the same encryption key(s) on more than one device, the private key(s) are copied from a device where they already reside, onto one or more additional devices, in a way that ensures that the encryption key(s) cannot be captured in transit.

In order to facilitate adoption of PKI for person-to-person and person-to-group communications, the system and methods herein can, in some embodiments, accomplish one or more of at least five goals. First, they can provide for the creation and secure storage of a user's private key and the retrieval of public keys for any other people with whom the user communicates. Second, the systems and methods herein can provide for the secure transfer of the user's private key to other devices that the user wishes to use for such communications, without creating any point in the interaction where there is a "break" in the cryptography, such that a third party could intercept and copy the user's private key. Third, the systems and methods herein can allow a user to, from any enrolled device in the user's control, force the de-authorization of any other device that has been associated with the user's private key, such that if a device is stolen, lost, or otherwise rendered outside of the user's control, the device cannot be used to compromise the user's communications. Fourth, variations provided herein include virtual key stores (VKS) that allow a user to remotely store and access their private keys. Fifth, the systems and methods herein can provide an efficient workflow for the user while maintaining security.

Figure 1:
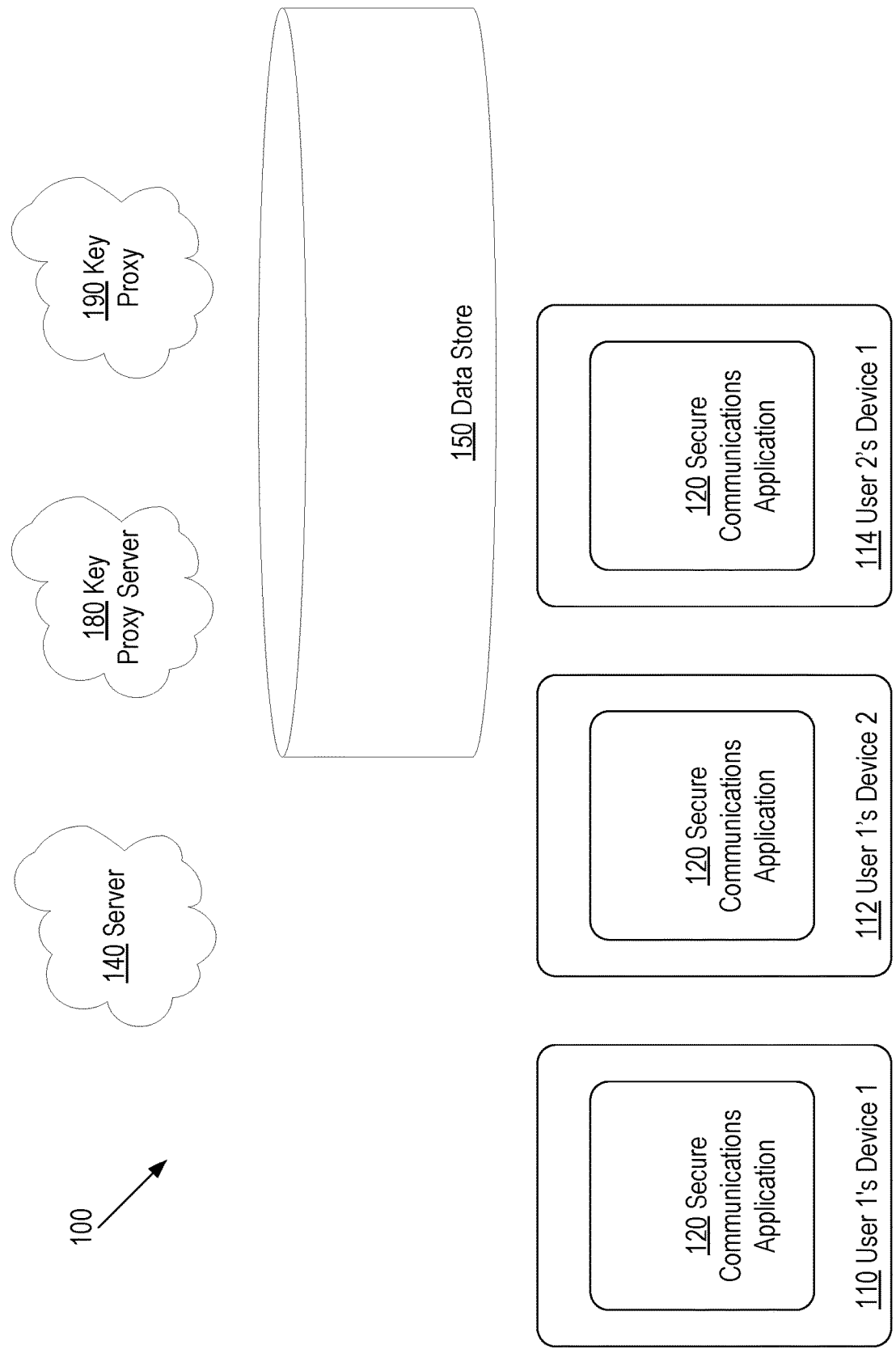
FIG. 1 depicts an exemplary secure communications system.

FIG. 1 depicts an exemplary secure communications system 100. The exemplary secure communications system 100 comprises a server 140, which can comprise one or more physical or virtual machines deployed either on premises or in cloud infrastructure and can communicate with a data store 150. The exemplary communications system 100 additionally comprises a key proxy server 180, which may or may not reside on the same physical or virtual hardware as the server 140, and one or more key proxy instances 190. The one or more key proxy instances 190 may remain unconfigured until required, and may be destroyed immediately after use. Furthermore, when a key proxy instance is allocated for use, another key proxy instance may be automatically built so that the number of the one or more key proxy instances 190 remains constant.

One or more users, e.g., individuals who have registered for the secure communications service, may use the exemplary secure communications system 100. The one or more users may use one or more user devices 110, 112, and 114, e.g., computing devices associated with a user's secure communications service account. The one or more users may use the one or more user devices 110, 112, and 114, to communicate with each other via the secure communications service. Each of the one or more user devices has an installed secure communications application 120 appropriate for its architecture (Linux, Windows, MacOS, Android, IOS). The one or more users may use one or more accounts, e.g., accounts with data-sharing services including e-mail providers such as Gmail or Outlook.com, content-storage services such as Dropbox or SharePoint, collaboration-messaging services such as Slack, instant message services, or other methods of person-to-person or group communications, as well as a secure communications service account.

Figure 2:
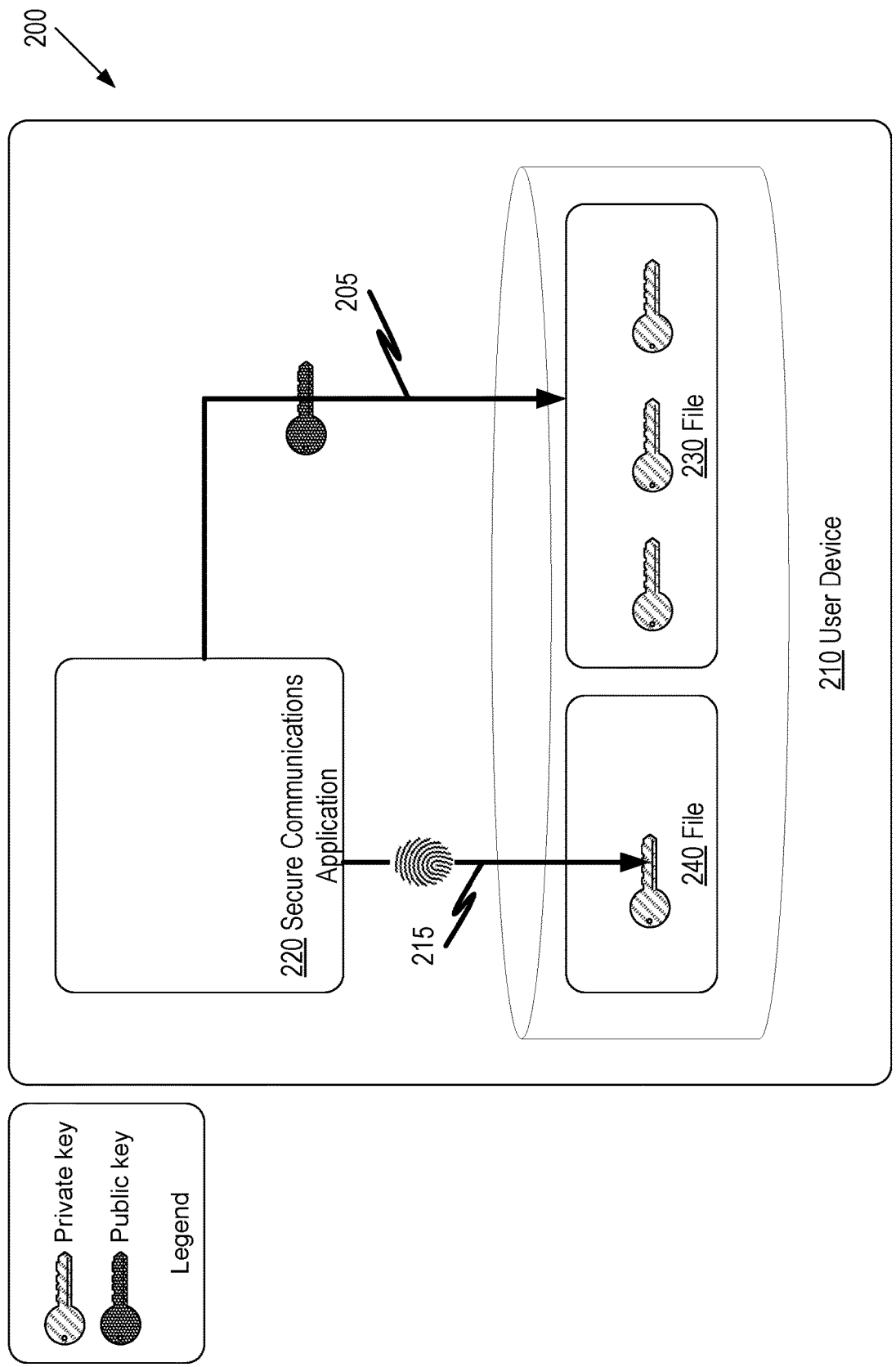
FIG. 2 depicts an exemplary authorized user device that stores user private keys.

FIG. 2 depicts an exemplary authorized user device that stores user private keys in an exemplary secure communications system 200. When a user device 210 is first initialized, it creates a file 230 for user key storage at 205. All initial user private keys are stored to the file 230. The file 230 is encrypted using a device public key. The device private key is stored in a file 240 for device key storage that is protected by PIN, password, or biometric means. When the user opens a secure communications application 220 on the device, the user must prove his/her identity to the secure communications application 220 by providing the appropriate PIN, password, or biometric authentication. The secure communications application 220 uses the identity information, e.g., the PIN, the password, or the biometric authentication, to unlock the device private key at 215. The secure communications application 220 uses the device private key to decrypt the file 230 containing the user private keys. When new user private keys are received, the user device 210 appends the new user private keys to the file 230 and re-encrypts the file 230 either with the current device public key, or with a newly-generated device public key. In this way, a user's historical keys are all available, so that the user may view messages and content that were encrypted using older keys, and all historical keys are protected using newly-generated device keys.

Figure 3:
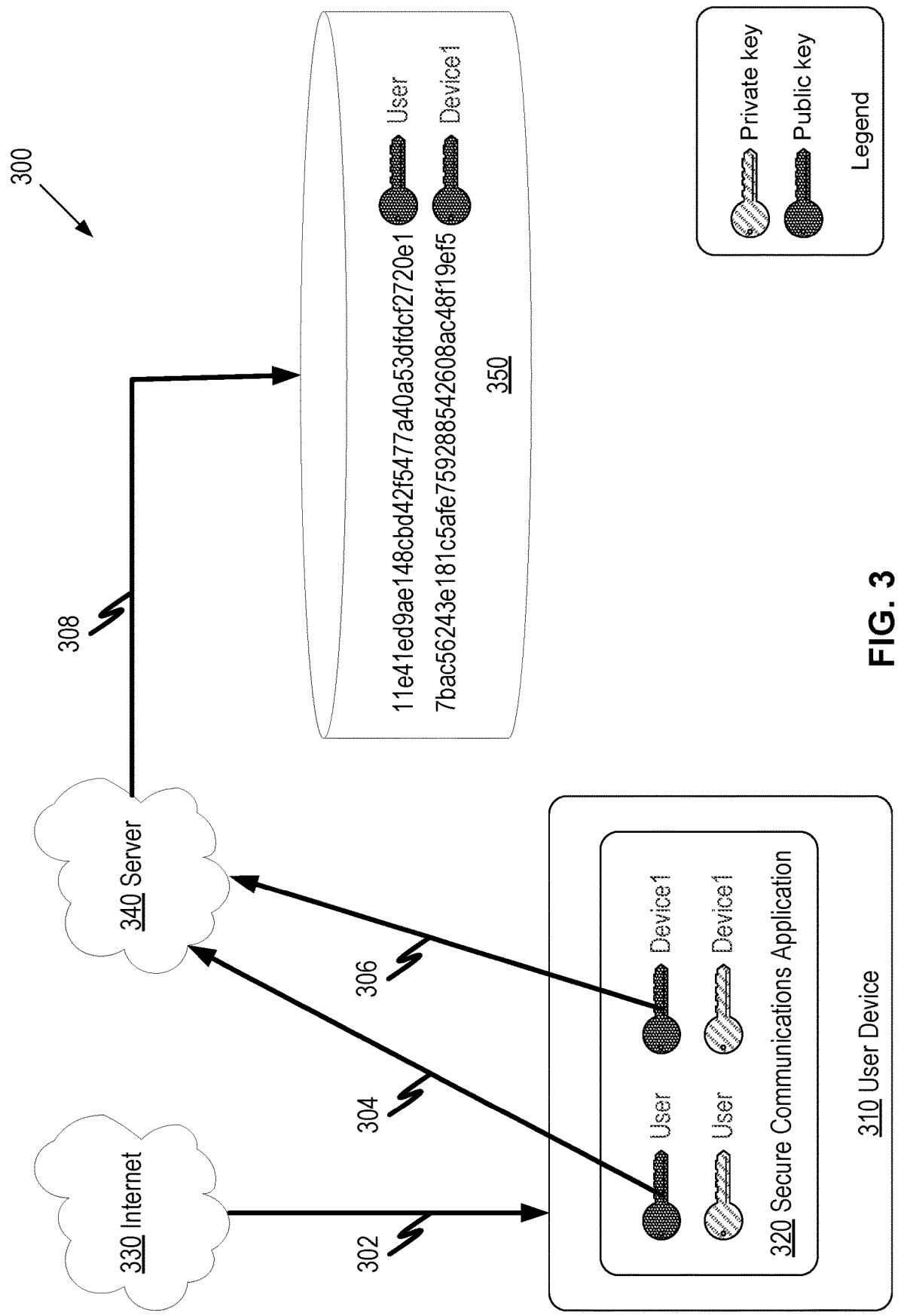
FIG. 3 is a diagram that depicts how a user of the system creates a new secure communications application account.

FIG. 3 is a diagram that depicts how a user of a secure communications system 300 creates a new secure communications application account in an exemplary secure communications system 300. At 302, the user, through a user device 310 downloads a secure communications application 320 from the internet 330. After installing the secure communications application 320, the user runs the secure communications application 320 and chooses to create a new secure communications application account. The user selects a username and password, and may, optionally, select biometric authentication (e.g. fingerprint) in order to access his/her account on devices with that capability. A user account entry is then created on a server 340 using HTTPS to protect the contents of the interaction because the user is deemed to be a trusted agent for the new account.

The secure communications application 320 generates two unique asymmetric key pairs: one pair that is specific to the device-a device key pair- and one pair that is specific to the user-a user key pair. Each pair contains a public key and a private key. The secure communications application 320 sends a cryptographic hash of the user's account name and device ID, along with the two public keys, i.e., a user public key and a device public key, at 304 and 306, respectively, to a server 340 via HTTPS. The server 340 stores the user and device public keys in association with the cryptographic hashes in a data store 350. Once a user device, e.g., the user device 310, is authenticated with the user's secure communications application account, all communications with the server 340 are performed with cryptographic signatures so that the server 340 can be certain that a sending device is who it says it is.

Figure 4:
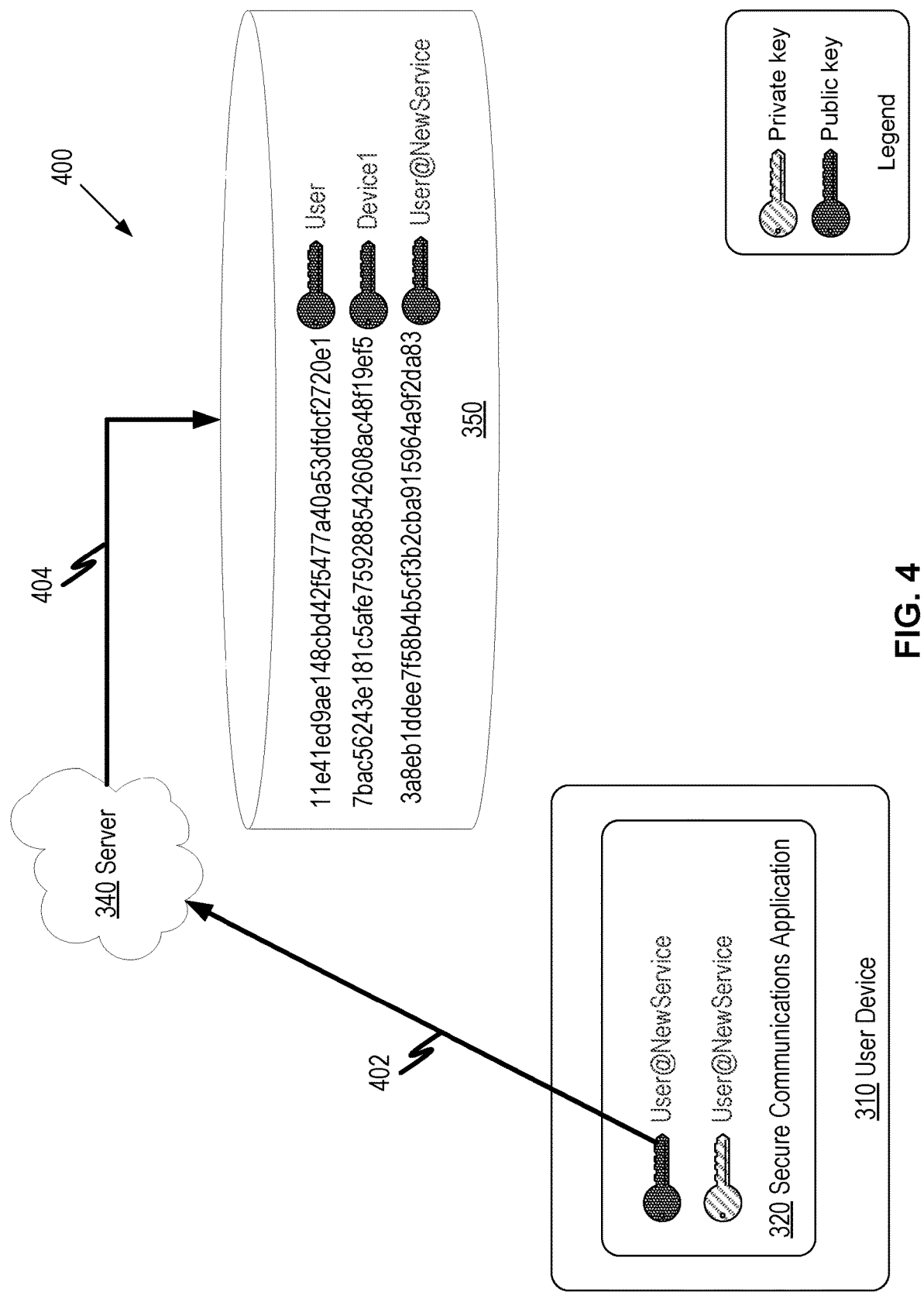
FIG. 4 is a diagram that depicts an association of a third-party account with an existing secure communications application account.

FIG. 4 is a diagram that depicts an association of a third-party account with an existing secure communications application account in an exemplary secure communications system. A user runs the secure communications application 320 on the user device 310 and chooses to associate a third party account with the user's secure communications application account. The secure communications application 320 generates a new asymmetric key pair for the third party account. At 402, the secure communications application 320 sends a cryptographic hash of the user's third-party account name, along with the respective public key, to the server 340. At 404, the server 340 stores the public key for the new account in association with the cryptographic hash in the data store 350.

Figure 5:
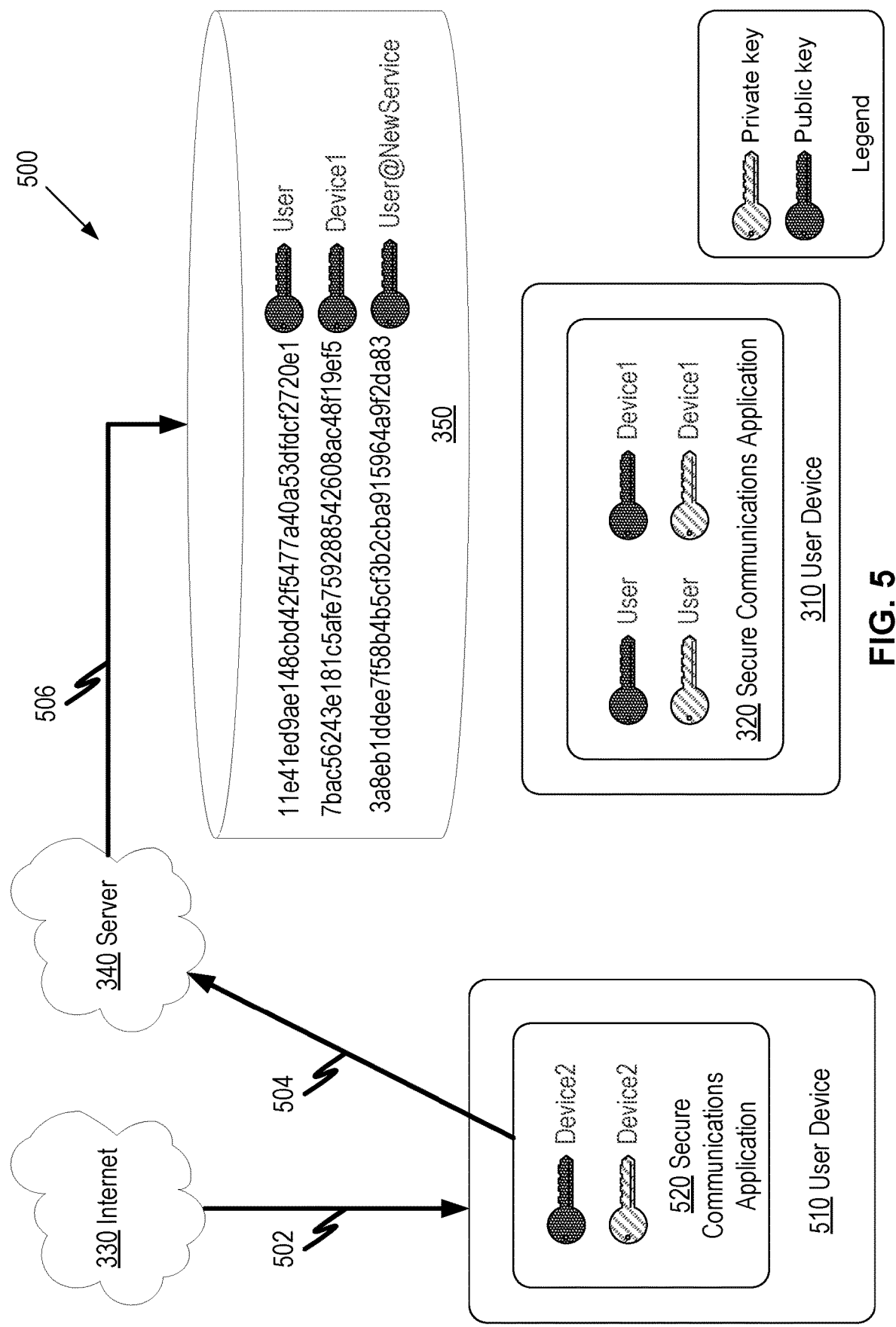
FIG. 5 is a diagram that depicts a first part of an association of a new user device with an existing user's secure communications application account.

FIG. 5 is a diagram that depicts a first part of an association of a new user device with an existing secure communications application account in an exemplary secure communications system 500. At 502, a user downloads a secure communications application 520 from the internet 330 onto the new user device, e.g., a user device 510. After installing the secure communications application 520, the user runs the secure communications application 520 and chooses to connect using an existing secure communications application account. The secure communications application 520 generates an asymmetric key pair for the existing secure communications application account, which is specific to the user device 510. At 504, the secure communications application 520 requests the public key associated with the cryptographic hash of the secure communications application account from the server 340. At 506, the server 340 requests the cryptographic hash from the data store 350.

Figure 6:
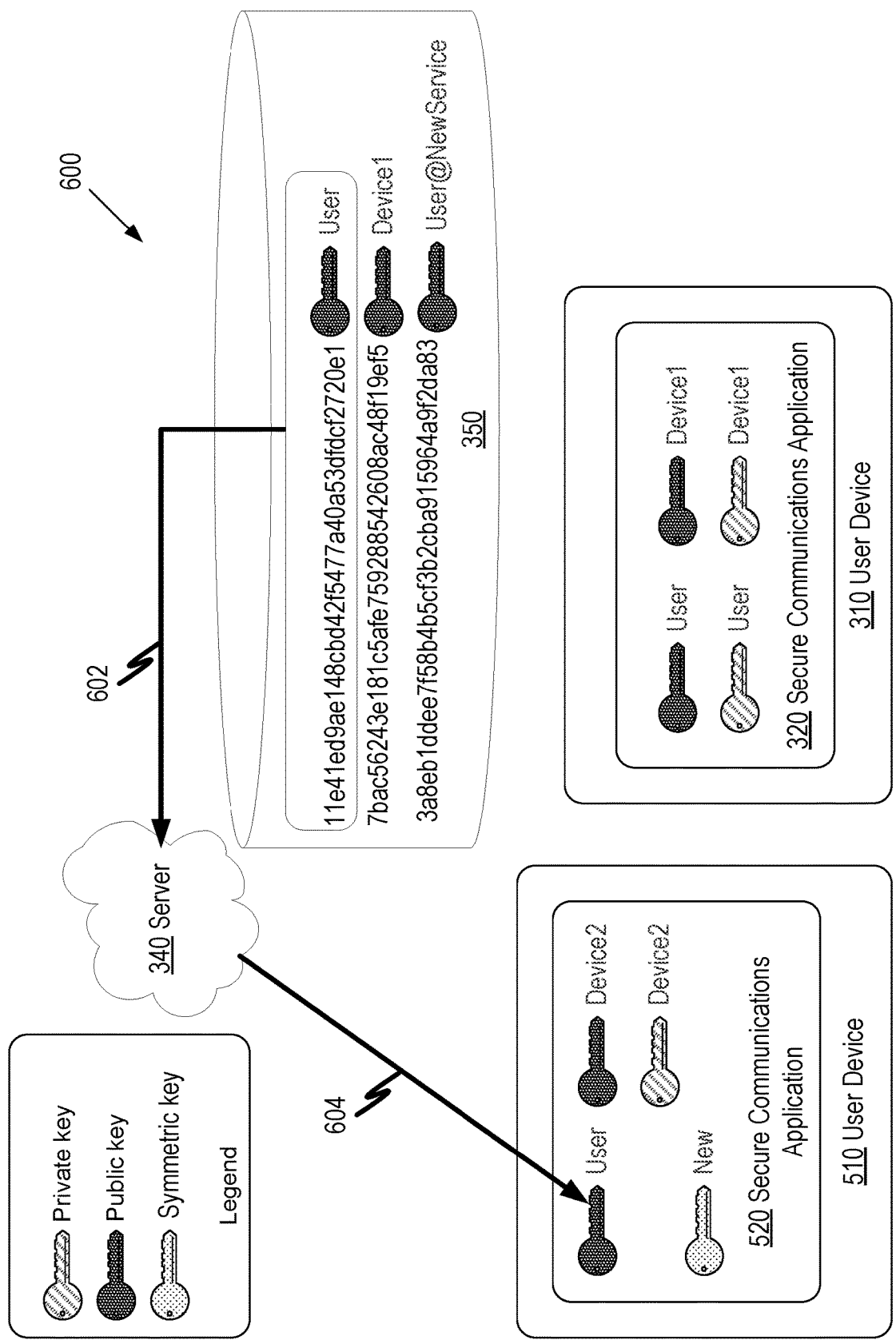
FIG. 6 is a diagram that depicts a second part of the association of the new user device with the existing secure communications application account.

FIG. 6 is a diagram that depicts a second part of the association of the new user device with the existing secure communications application account in an exemplary secure communications system 600. At 602, the server 340 retrieves the appropriate public key from the data store 350. At 604, the server 340 sends the appropriate public key to the secure communications application 520, if it is available. The secure communications application 520 generates a symmetric key.

Figure 7:
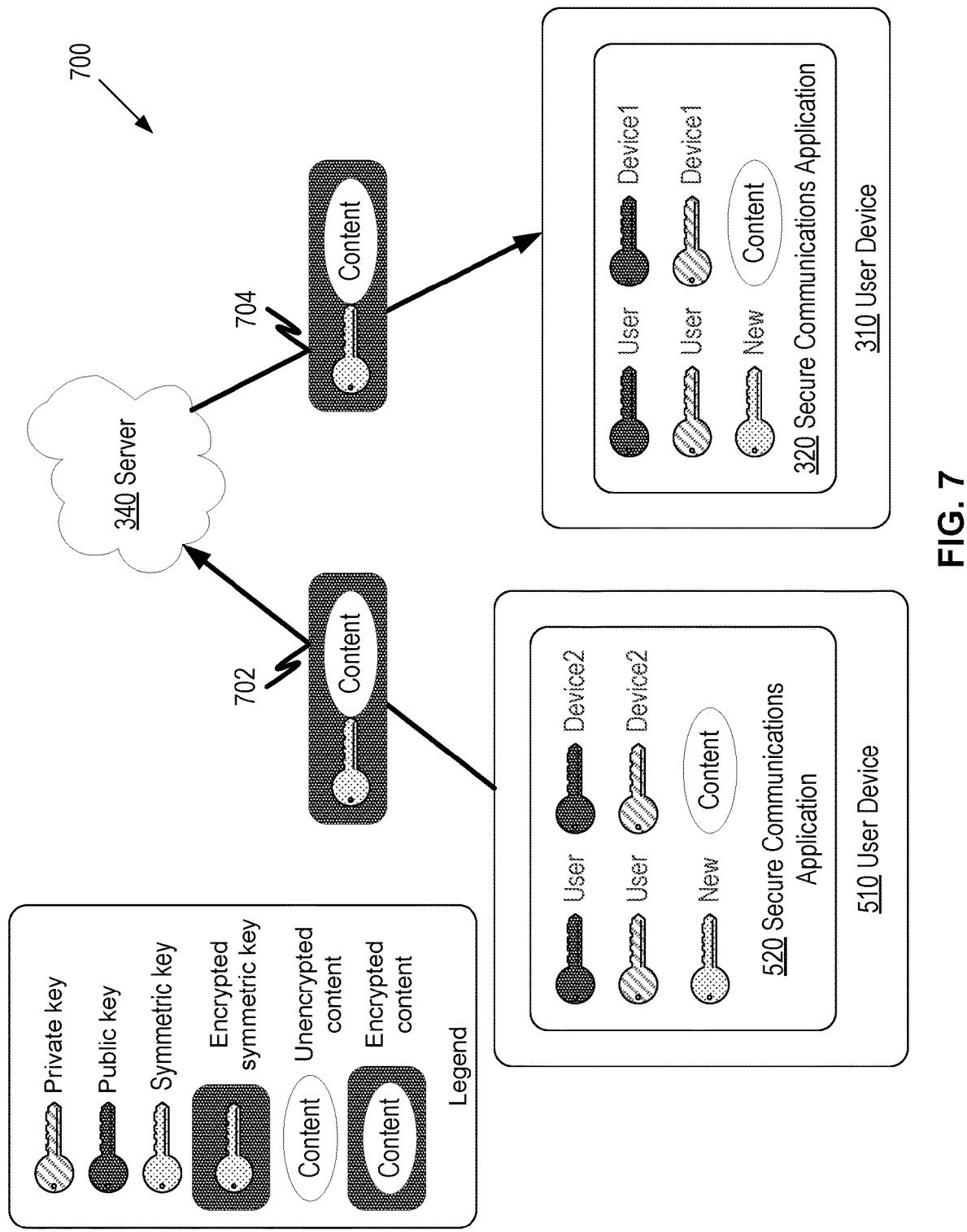
FIG. 7 is a diagram that depicts a third part of an association of a new user device with the existing secure communications application account.

FIG. 7 is a diagram that depicts a third part of the association of the new user device with the existing secure communications application account. The user device 510 creates and encrypts a message requesting the user's private keys and including the symmetric key. At 702, the user device 510 encrypts the message and sends it to the server 340, addressed to the user of the user device 310. At 704, the server 340 forwards the message to all of the user's authorized user devices, e.g., the user device 310. The user device 310 already has the user's private key, so it is able to decrypt the symmetric key and content of the request. The user device 310 presents a verification dialog to the user asking whether the user confirms that the user device 510 should be added to the existing secure communications application account. If the user confirms, the key transfer happens in accordance with the methods discussed with reference to FIGS. 11-15.

Figure 8:
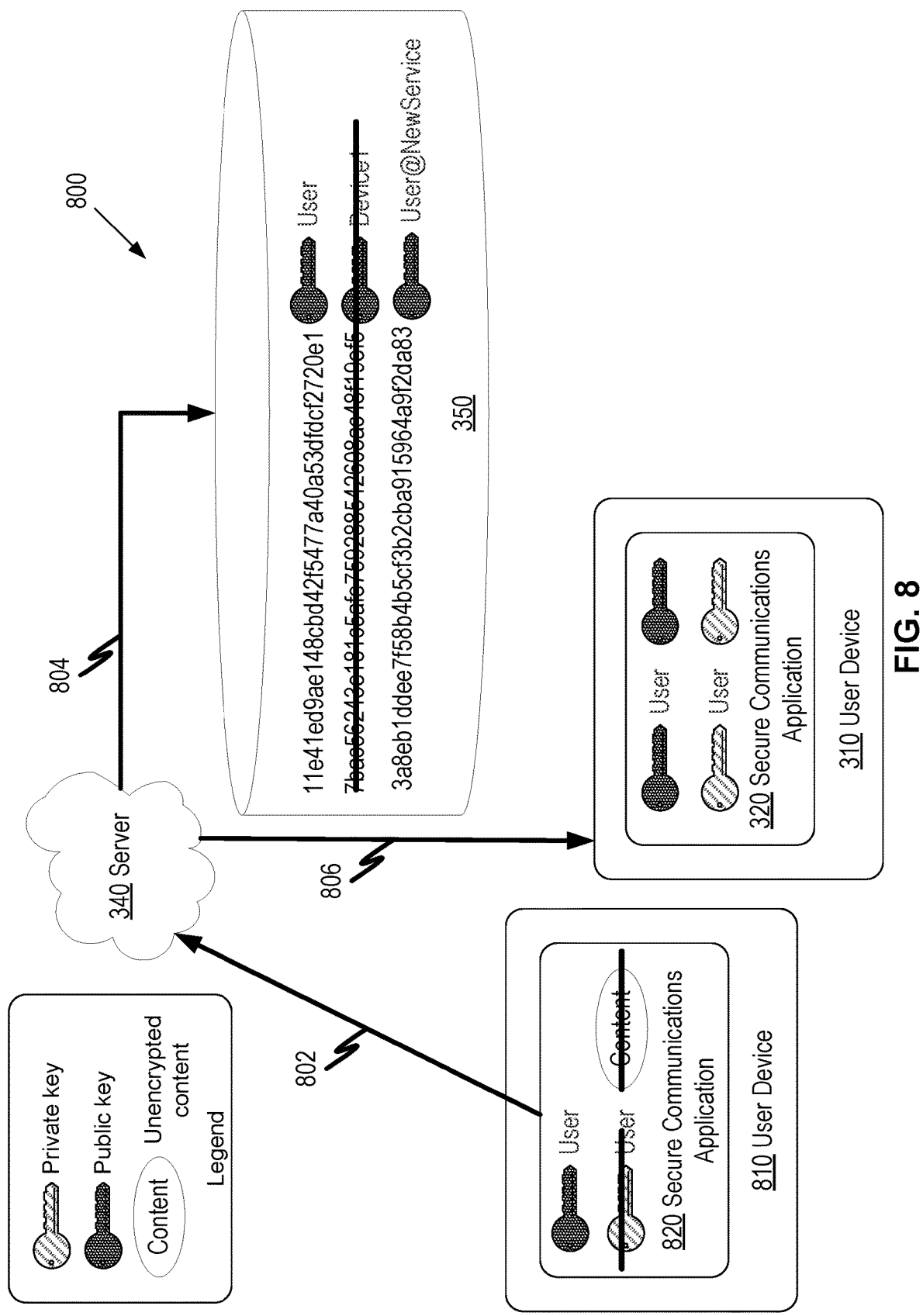
FIG. 8 is a diagram that depicts self-removal/de-authorization of a user device, e.g., a user device 810, from an existing secure communications application account.

FIG. 8 is a diagram that depicts self-removal/de-authorization of a user device, e.g., a user device 810, from an existing secure communications application account in an exemplary secure communications system 800. The user runs a secure communications application 820 and chooses to remove and de-authorize the user device 810. At 802, the secure communications application 820 sends, to the server 340, a signed, encrypted message indicating that it should be removed from a user's list of authorized devices. The secure communications application 820 deletes all of the user's private keys and content stored on the user device 810. At 804, the server 340 removes the device requesting removal, i.e., the user device 810, from the user's list of authorized devices in the data store 350 by requesting removal of the device key. At 806, the server 340 sends a message encrypted with the user's public key to remaining devices, e.g., the user device 310, indicating that the device requesting removal, i.e. user device 810, has been removed.

Figure 9:
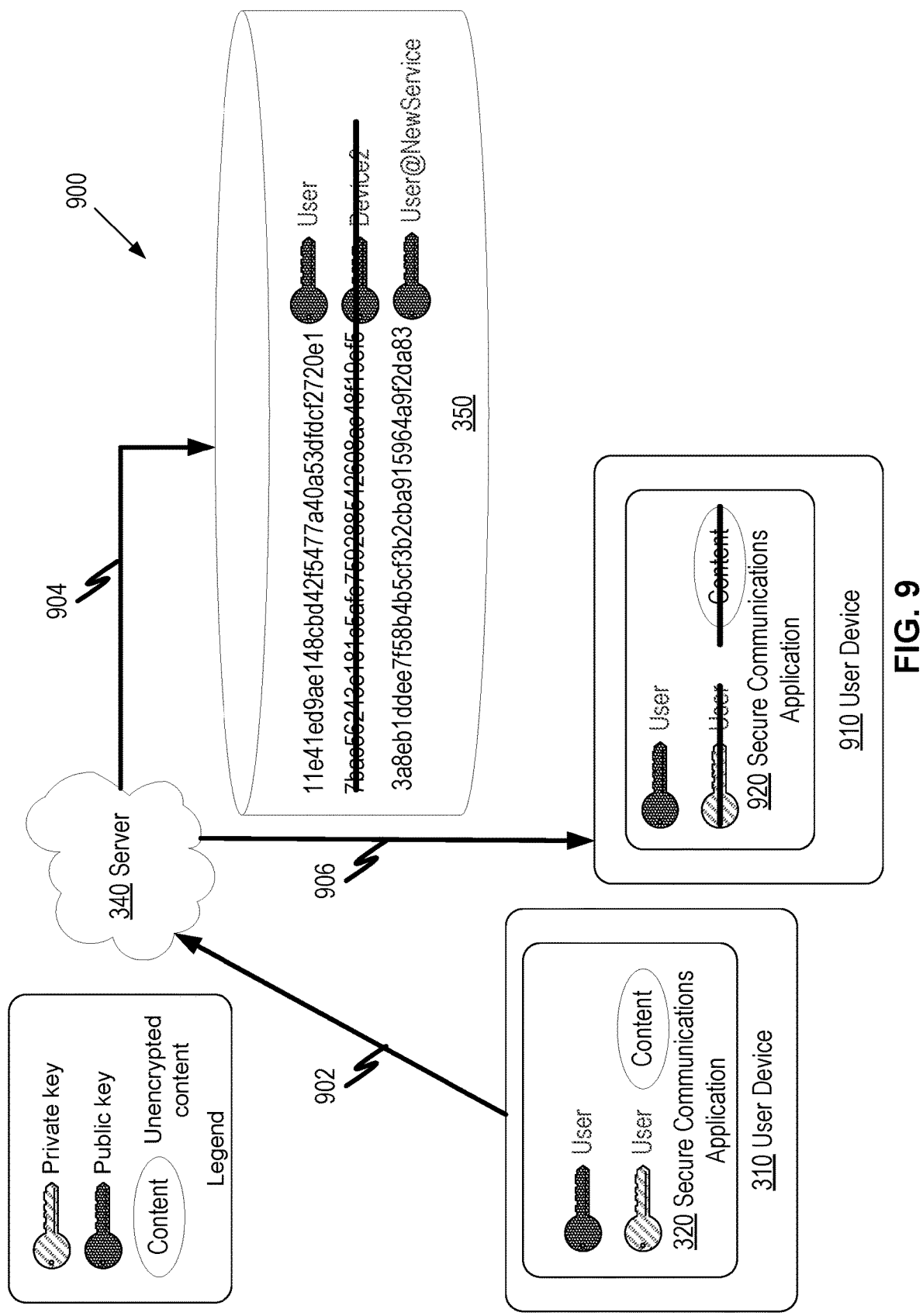
FIG. 9 is a diagram that depicts remote self-removal/de-authorization of a user device e.g., a user device 910, from an existing secure communications application account.

FIG. 9 is a diagram that depicts remote removal/de-authorization of a user device e.g., a user device 910, from an existing secure communications application account in an exemplary secure communications system 900. The user runs a secure communications application 320 on the user device 310 and chooses to remove and de-authorize a different device, i.e., the user device 910 installed with a secure communications application 920. At 902, the secure communications application 320 sends, to the server 340, a signed, encrypted message indicating that the user device 910 should be removed from the user's list of authorized devices. At 904, the server 340 removes the user device 910 from the user's list of authorized devices in the data store 350. At 906, the server 340 sends a message encrypted with the user's public key to the user device 910, indicating that that it has been de-authorized, and must remove all private keys and content. If the user device 910 receives the message, the secure communications application 920 removes keys and content as directed.

Figure 10:
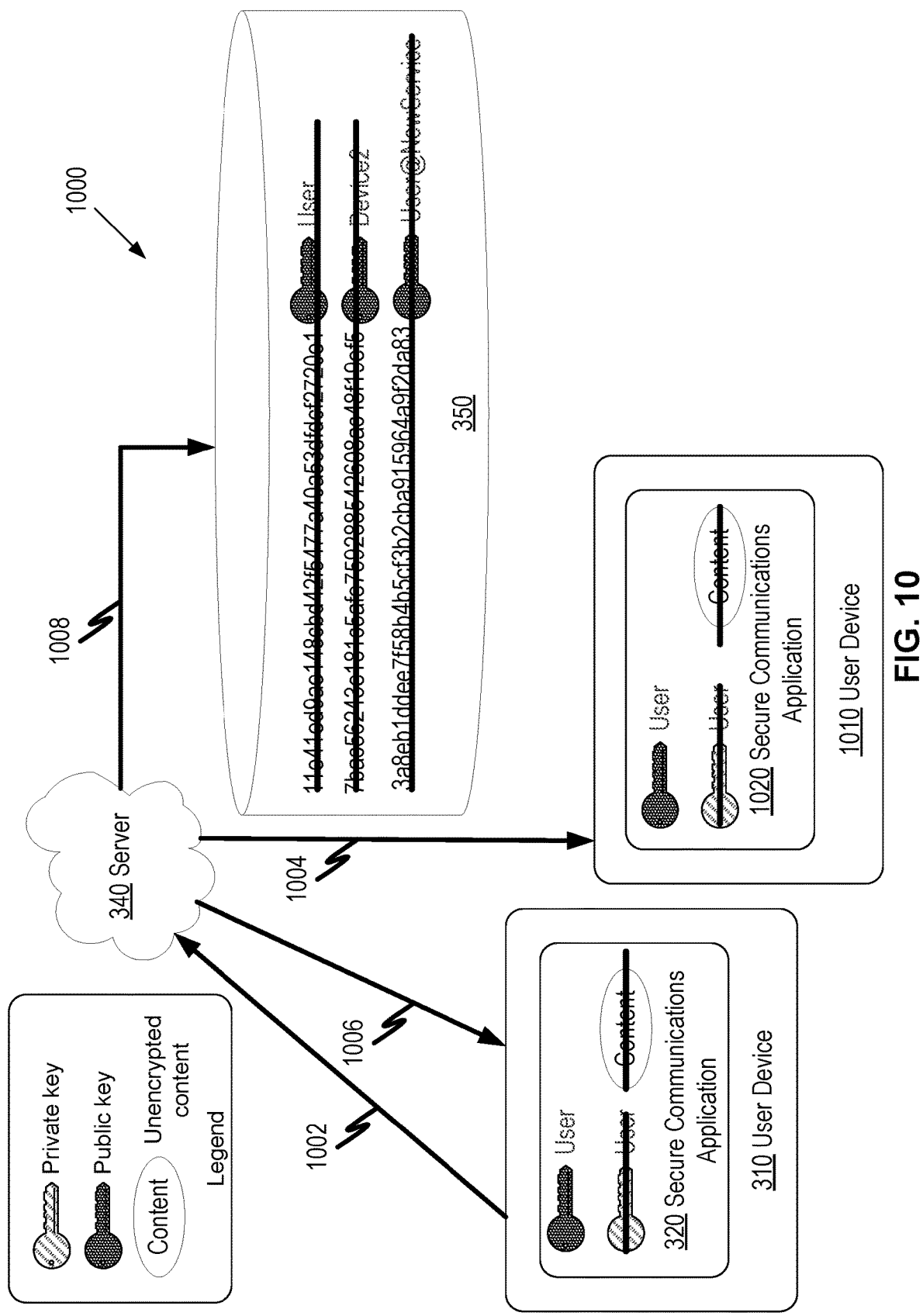
FIG. 10 is a diagram that depicts removal of all devices associated with a secure communications application account.

FIG. 10 is a diagram that depicts removal of all devices associated with a secure communications application account in an exemplary secure communications system 1000. The user runs the secure communications application 320 on the user device 310 and chooses to remove the secure communications application account. At 1002, the secure communications application 320 sends, to the server 340, a signed, encrypted message indicating that the secure communications application account is to be removed. At 1004, the server 340 sends a message encrypted with the user's public key to all user devices, e.g., the user device 1010, and at 1006 to the requesting device, i.e., the user device 310, directing each user device to remove all user private keys and content stored on each of the user devices. Each of the user devices that receive the message remove the private keys and content stored on the user device. At 1008, the server 340 removes all of the user devices, i.e. user and device keys, and the user's account from the data store 350.

Figure 11:
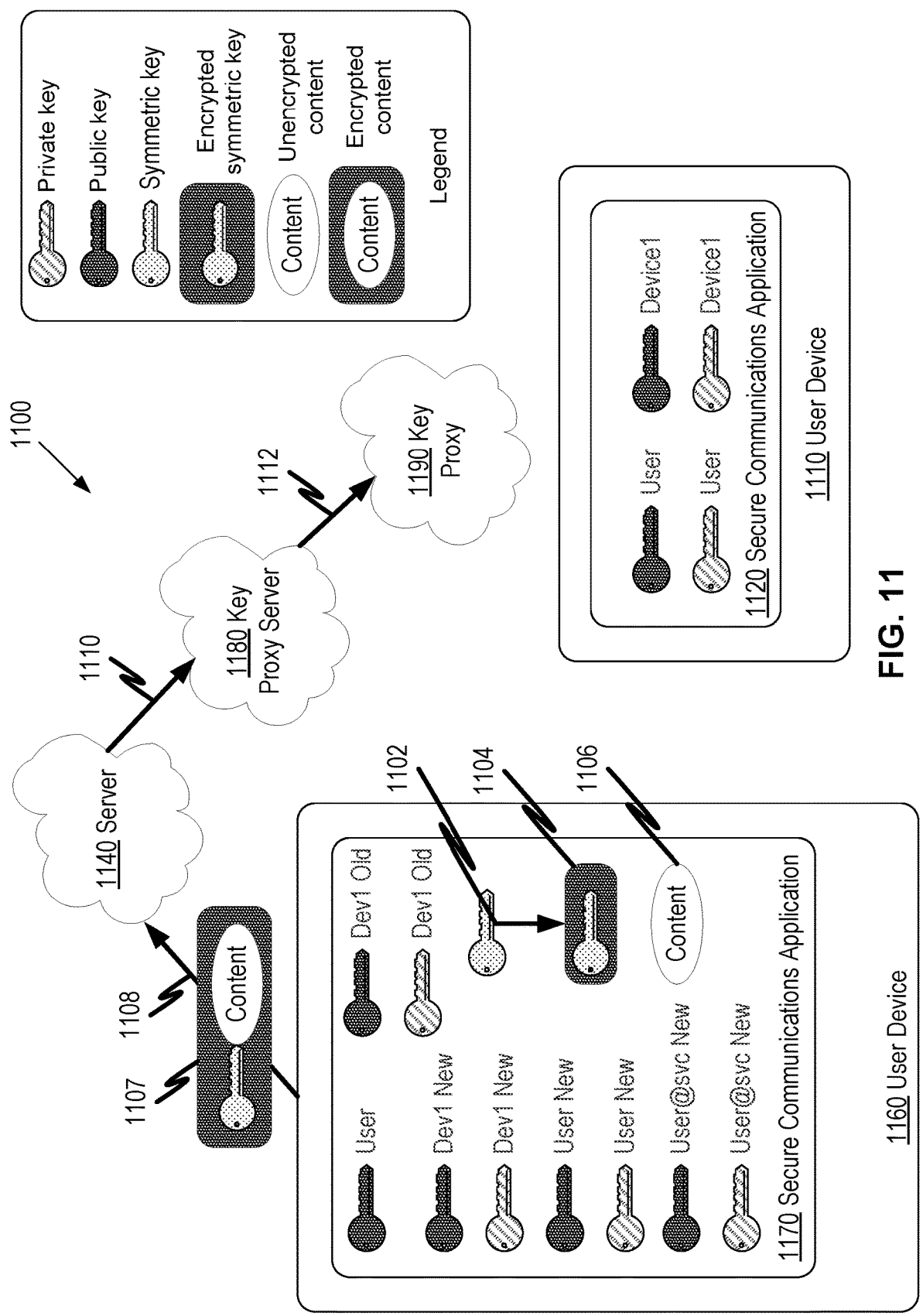
FIG. 11 is a diagram that depicts a first part of automatic private key dissemination to an authorized device.

FIG. 11 is a diagram that depicts a first part of an automatic private key dissemination to an authorized device in an exemplary secure communications system 1100. At 1102, the up-to-date device, i.e., user device 1160, generates a new symmetric key. At 1104, the user device 1160 encrypts the new symmetric key with the server's public key. At 1106, the user device 1160 creates a message 1107 requesting a key proxy instance and comprising the public device key for all devices that need to be brought up-to-date. The message 1107 is encrypted by the user device 1160 using the symmetric key it just generated and signs the message using its own device private key. At 1108, the user device 1160 sends the message 1107 to a server, e.g., a server 1140.

The server 1140 checks the signature of the message, and if it correctly matches the public key that the server has on record in a data store for the device making the request, it decrypts the symmetric key using its own private key, and then uses the symmetric key to decrypt the message. At 1110, the server 1140 directs a key proxy server, i.e., a key proxy server 1180 to allocate a key proxy instance for use, and specifies the requesting device's public key as the only device authorized to upload information to that key proxy instance. At 1112, the key proxy server 1180 allocates a key proxy instance, e.g., a key proxy instance 1190, from a pool of available proxies.

Figure 12:
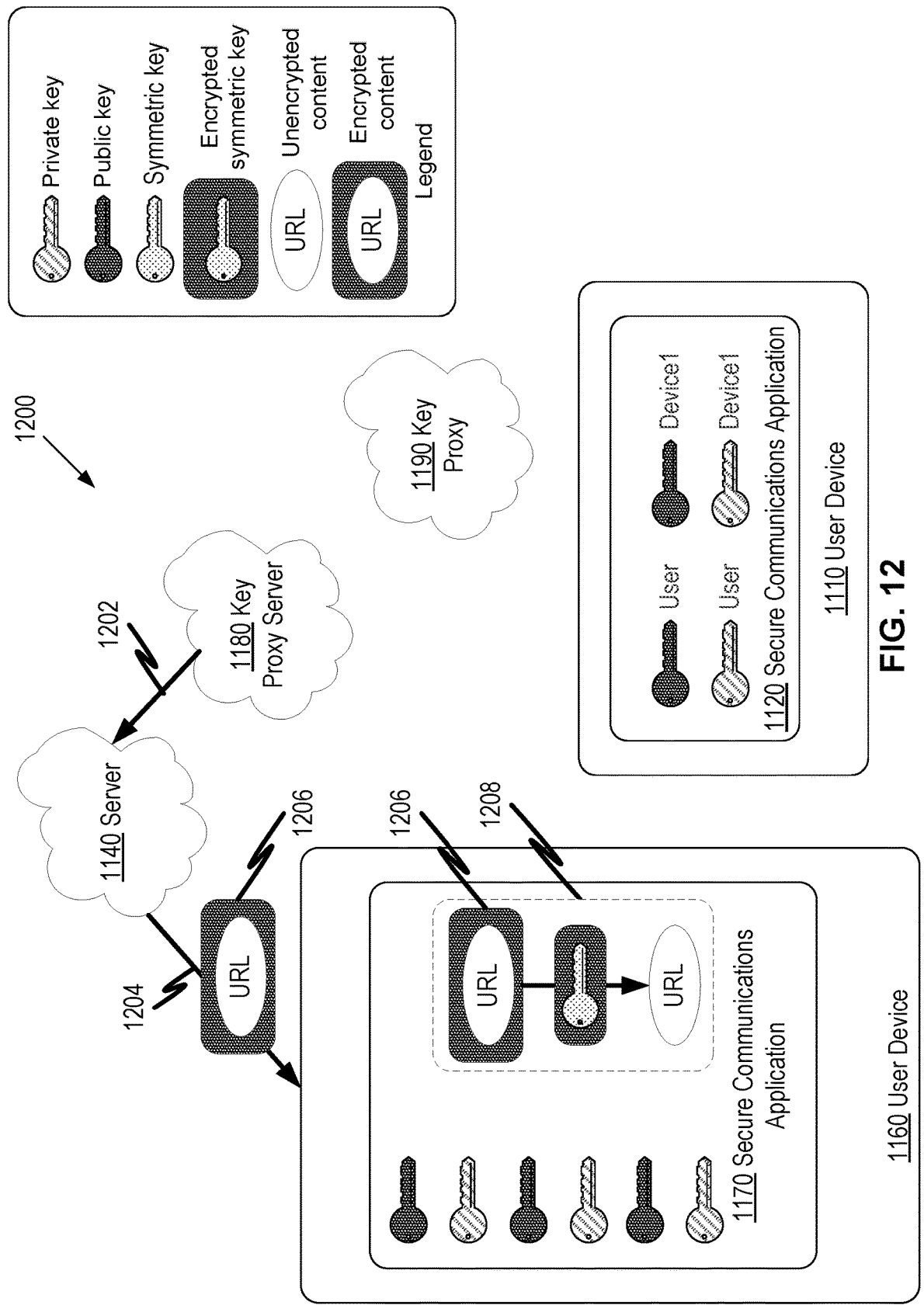
FIG. 12 is a diagram that depicts a second part of the automatic private key dissemination to authorized devices.

FIG. 12 is a diagram that depicts a second part of the automatic private key dissemination to authorized devices in an exemplary secure communications system 1200. At 1202, the key proxy server 1180 provides the server 1140 with a unique URL 1206 for the key proxy instance 1190. The server 1140 creates a response message comprising the unique URL 1206, encrypts the message with the symmetric key sent by the requesting device, i.e., the user device 1160, and signs the message with its own private key. At 1204, the server 1140 sends the message to the requesting device, i.e., user device 1160. At 1208, the requesting device decrypts the unique URL 1206.

Figure 13:
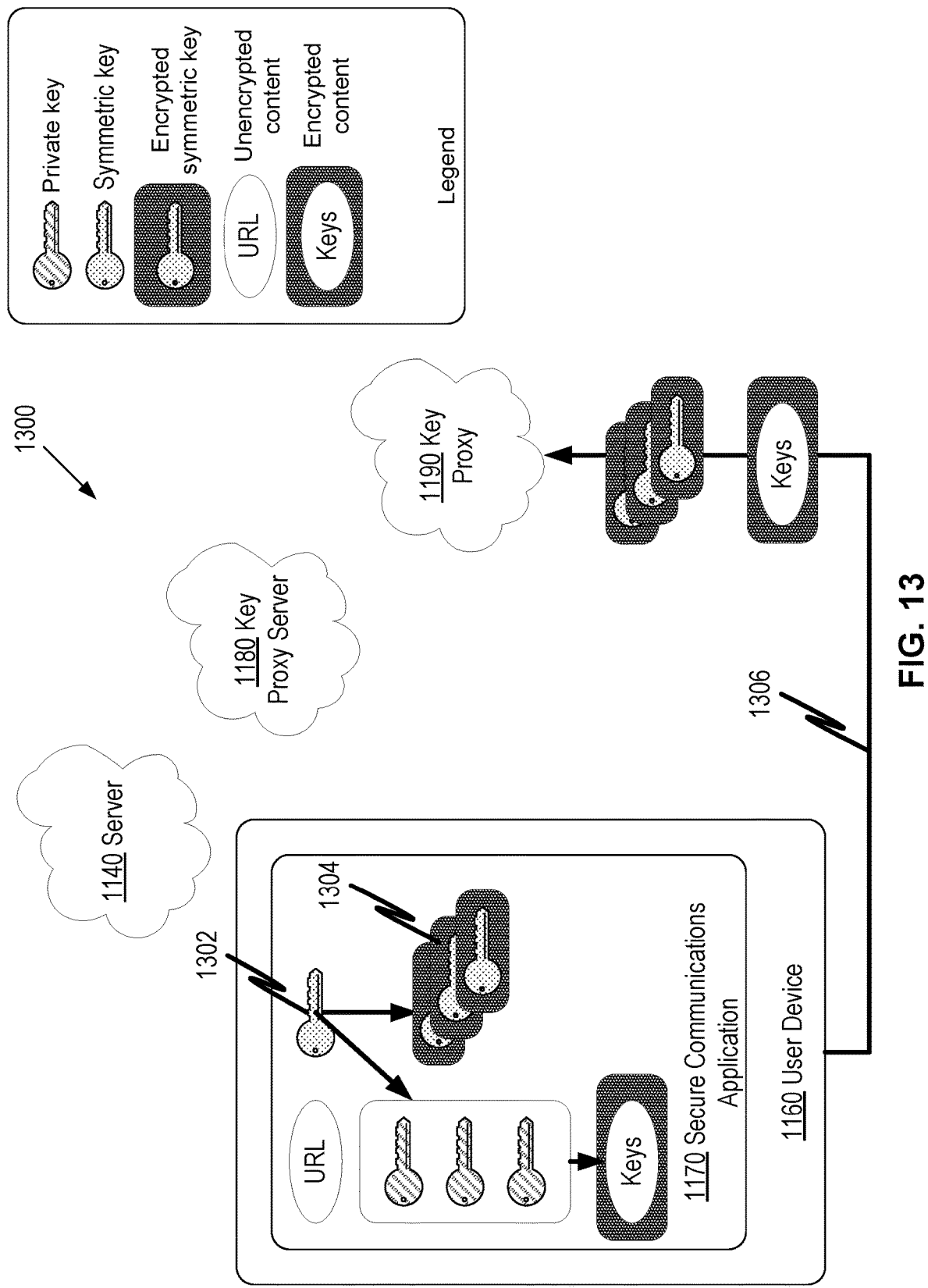
FIG. 13 is a diagram that depicts a third part of the automatic private key dissemination to authorized devices.

FIG. 13 is a diagram that depicts a third part of the automatic private key dissemination to authorized devices in an exemplary secure communications system 1300. At 1302, the user device 1160 generates another symmetric key, and encrypts all of its user private keys with the symmetric key. At 1304, the user device 1160 then encrypts the symmetric key with each of the device public keys of any devices that need to be updated with the user's private keys. The user device 1160 generates one or more messages comprising one or more encrypted symmetric keys (one for each device to which it is disseminating keys) and a private key bundle that has been encrypted with the symmetric key. The user device 1160 signs the one or more messages with its own device private key. At 1306, the user device 1160 establishes an HTTPS connection to the key proxy instance 1190, using the unique URL that was provided by the server 1140, and sends the signed message. The key proxy instance 1190 receives the message and checks the signature to ensure that it matches the public key it was given by the key proxy server 1180. If there is a match, the key proxy instance 1190 accepts the message and prepares to send the encrypted bundle to authorized requesters.

Figure 14:
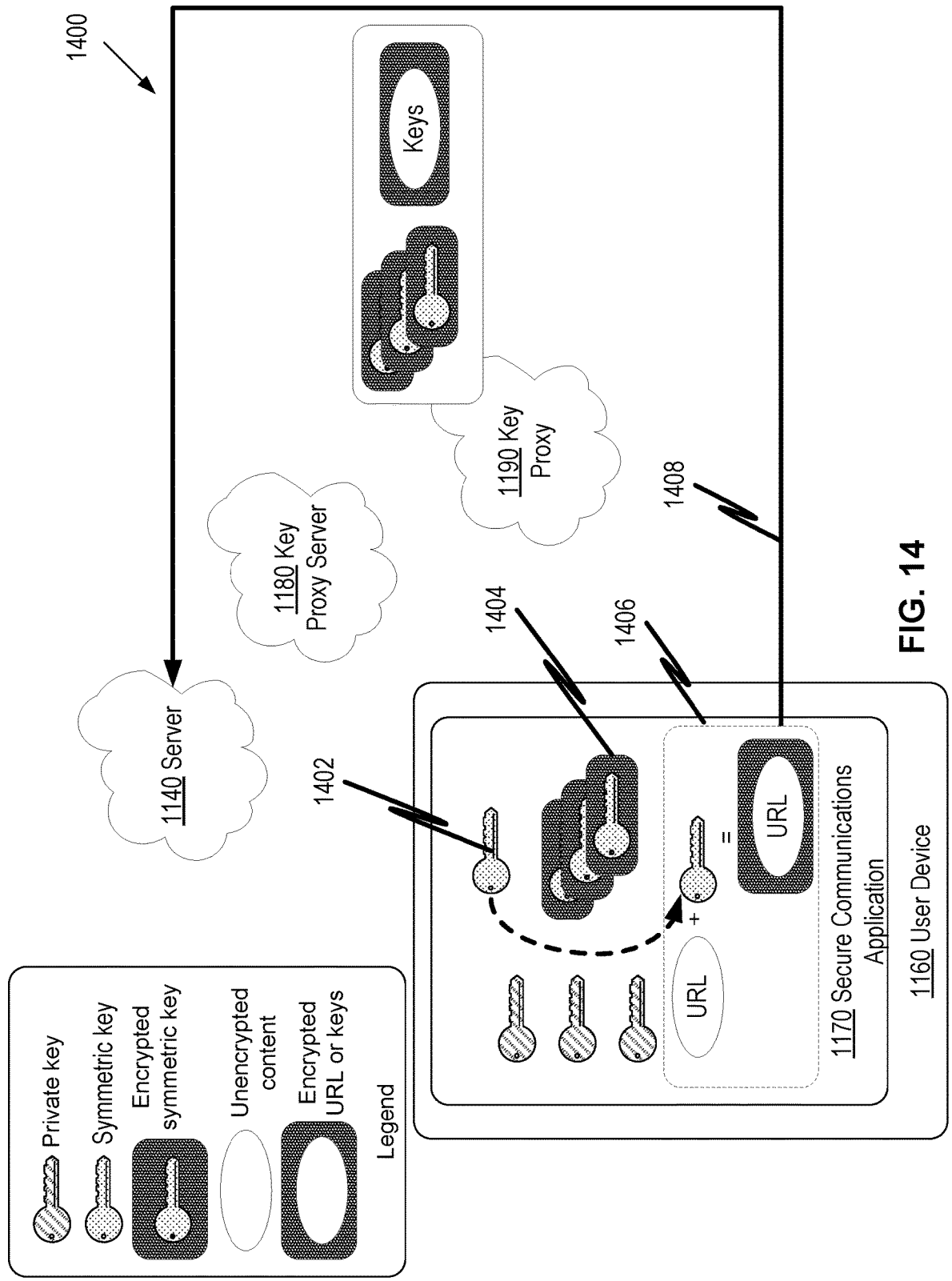
FIG. 14 is a diagram that depicts a fourth part of the automatic private key dissemination to authorized devices.

FIG. 14 is a diagram that depicts a fourth part of the automatic private key dissemination to authorized devices in an exemplary secure communications system 1400. At 1402, the user device 1160 generates another symmetric key. At 1404, the user device 1160 encrypts the symmetric key with each of the device public keys of any devices that need to be updated with the user's private keys. At 1406, the user device 1160 creates a message containing the unique URL of the key proxy instance 1190 and encrypts that message using the symmetric key. The user device 1160 signs the message using its own device private key, and sends it to the server 1140 at 1408, addressed to all authorized devices for the user.

Figure 15:
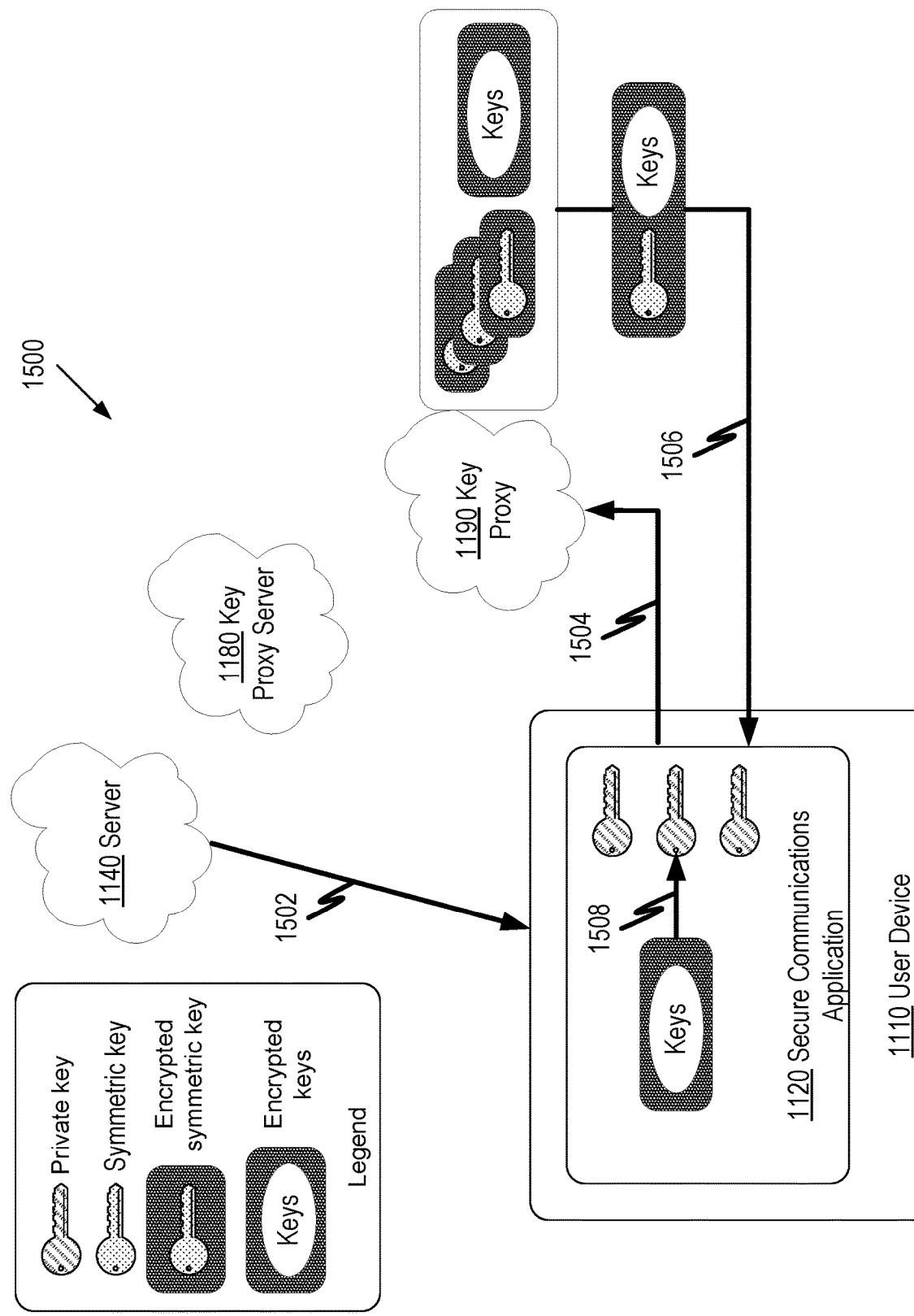
FIG. 15 is a diagram that depicts a fifth part of the automatic private key dissemination to authorized devices.

FIG. 15 is a diagram that depicts a fifth part of the automatic private key dissemination to authorized devices in an exemplary secure communications system 1500. At 1502, the server 1140 cannot decrypt the message, but forwards it to all of other devices associated with the user's secure communications application account. Each user device, e.g., user device 1110, checks the signature to ensure that it came from the user device it claims to have come from. If the signature is valid, each user device decrypts the symmetric key contained in the message using its own device private key, then decrypts the unique URL of the key proxy instance 1190 using the symmetric key. Each user device then generates a request for key download, signing the request with its own private key. At 1504, each user device connects to the key proxy instance 1190 at the specified URL and sends the signed request. At 1506, if the signature matches one of the device public keys that was provided to the key proxy instance 1190, the key proxy instance 1190 sends the encrypted key bundle to each user device. Each user device then uses its own private key to decrypt the symmetric key in the bundle, then uses that symmetric key to decrypt the set of user private keys the bundle comprises.

Figure 16:
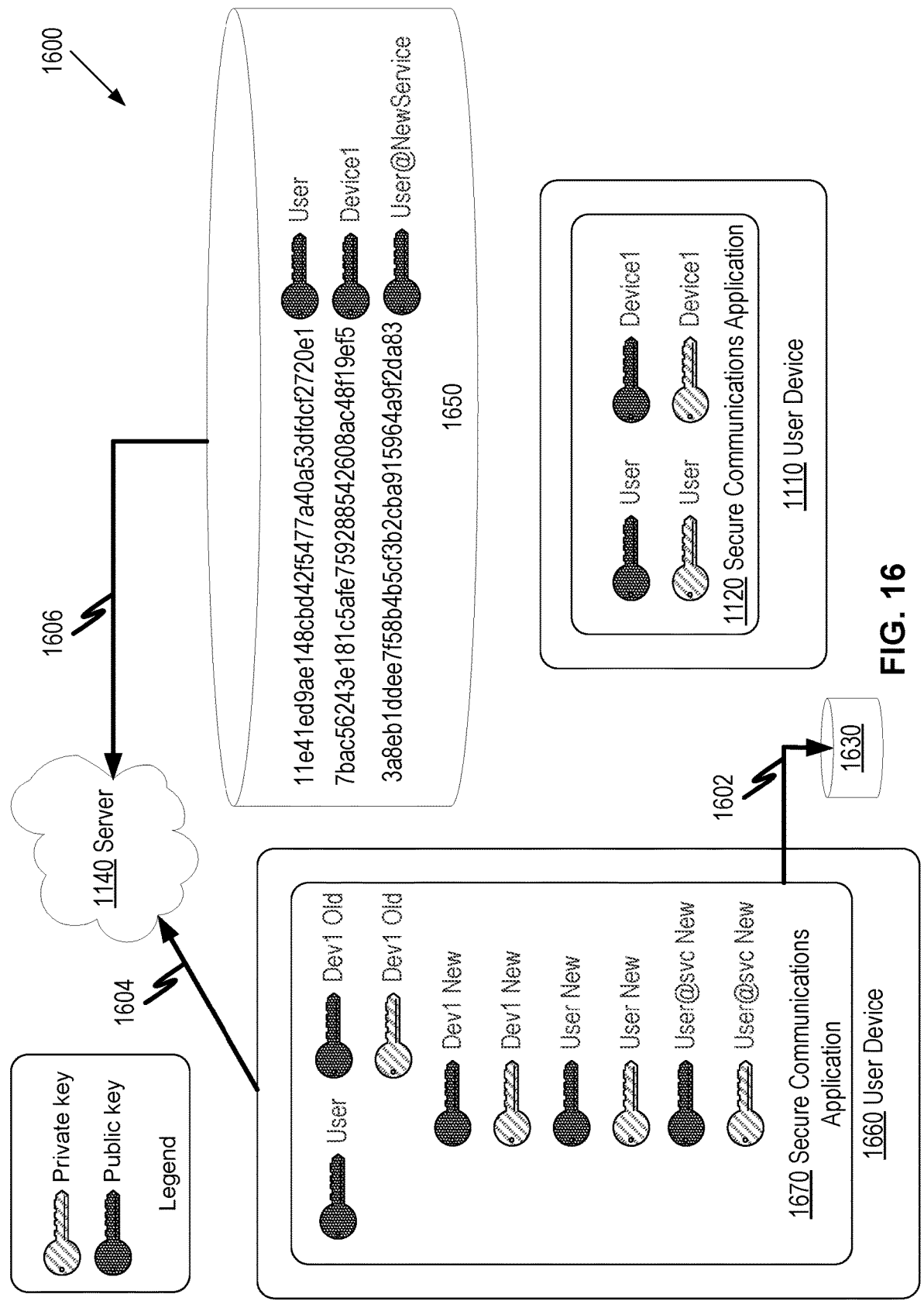
FIG. 16 is a diagram that depicts re-initialization of keys associated with a secure communications application account and third party accounts.

FIG. 16 is a diagram that depicts re-initialization of keys associated with a secure communications application account and third party accounts in an exemplary secure communications system 1600. An initiating device, i.e., the user device 1660, creates a new device key pair for itself. The initiating device creates a new user key pair for every account (both secure communications application account and third-party accounts) that the user has registered with the secure communications application 1670. At 1602, the user device 1660 stores its new keys locally in local storage 1630, in accordance with the method described with reference to FIG. 2. At 1604, the user device 1660 sends, to the server 1140, an encrypted signed message indicating that a key dissemination needs to occur. Key dissemination follows the method described with reference to FIGS. 11-15.

Figure 17:
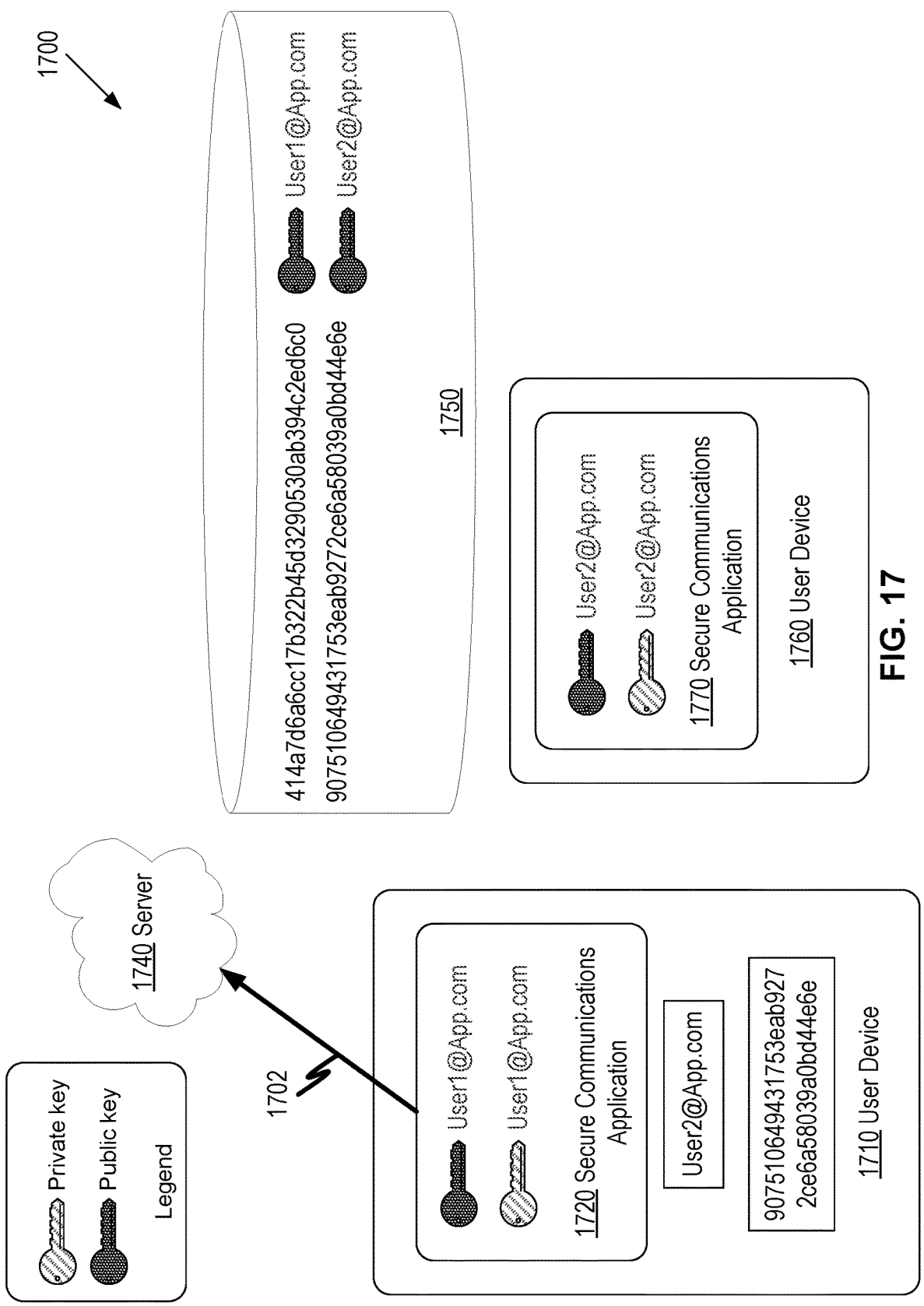
FIG. 17 is a diagram that depicts a first part of sending data from a user to another user.

FIG. 17 is a diagram that depicts a first part of sending data from a first user to a second user in an exemplary secure communications system 1700. The first user, using a secure communications application, e.g., a secure communications application 1720, on one of his/her authorized devices, e.g., user device 1710, indicates that the first user wants to send information to a second user, e.g. user device 1760, by clicking on the second user's name in their friend list, or by other means appropriate. The secure communications application 1720 takes the second user's user ID, combines it with a service name or a medium name into a string, and creates a cryptographic hash of the combined string. The secure communications application 1720 creates an encrypted, signed message requesting the user public key associated with that hash, and sends the message to the server 1140 at 1702.

Figure 18:
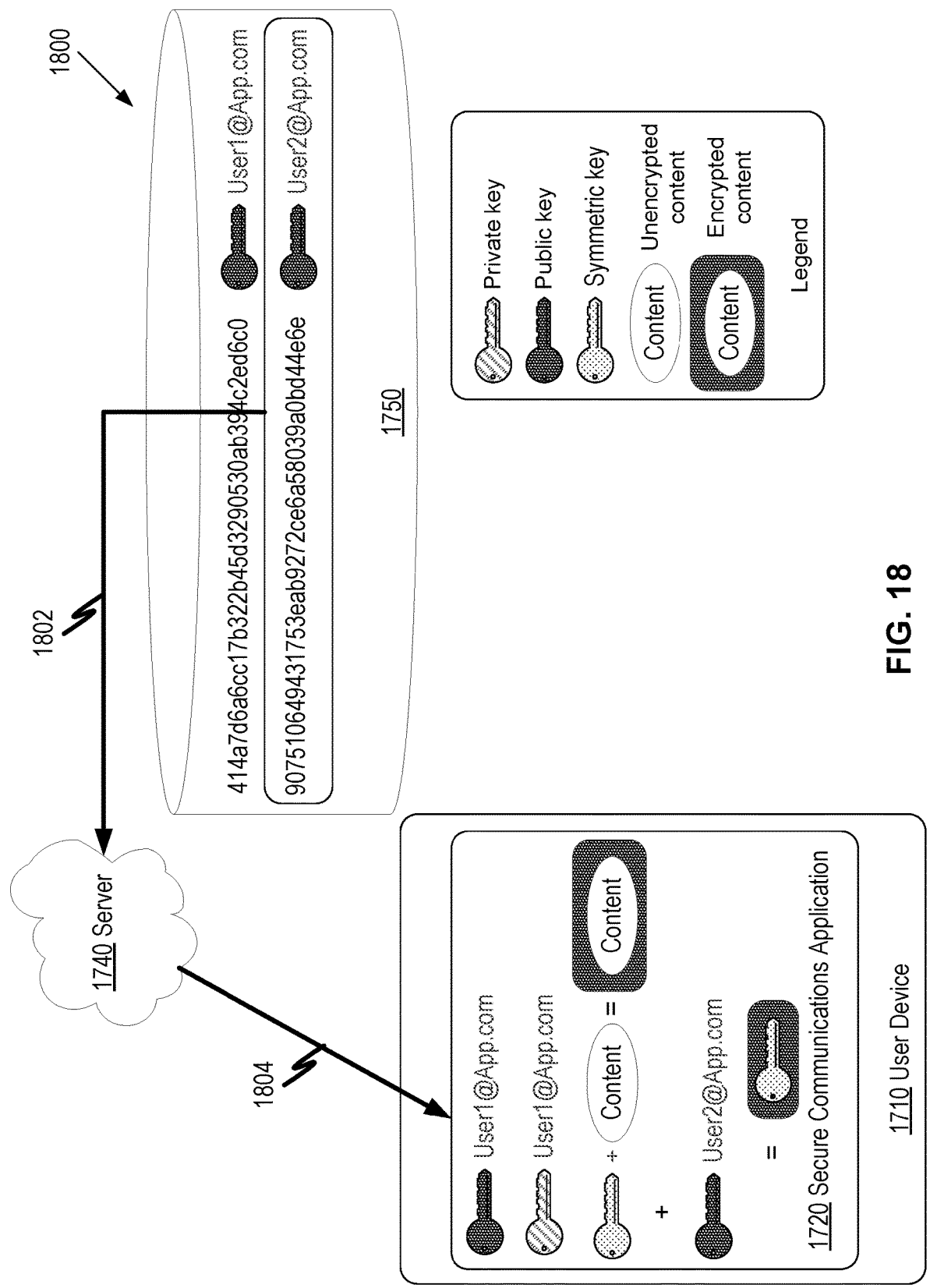
FIG. 18 is a diagram that depicts a second part of sending data from a user to another user.

FIG. 18 is a diagram that depicts a second part of sending data from the first user to the second user in an exemplary secure communications system 1800. At 1802, the server 1740 retrieves the hash from a data store 1750. If there is a key associated with that hash in the data store 1750, the server 1740 creates an encrypted, signed message containing the key. At 1804, the server 1740 sends the encrypted, signed message back to the secure communications application 1720 running on the user device 1710. The secure communications application 1720 receives the key, and uses it, in conjunction with a newly-generated symmetric key, as well as the information the user wishes to communicate (e.g., a text message, a file, or other content) to create a bundle which contains: (1) the symmetric key, encrypted with the user public key of the desired recipient; (2) a cryptographic hash of the public key that was used to encrypt the symmetric key; (3) the actual user-supplied content to be sent.

Figure 19:
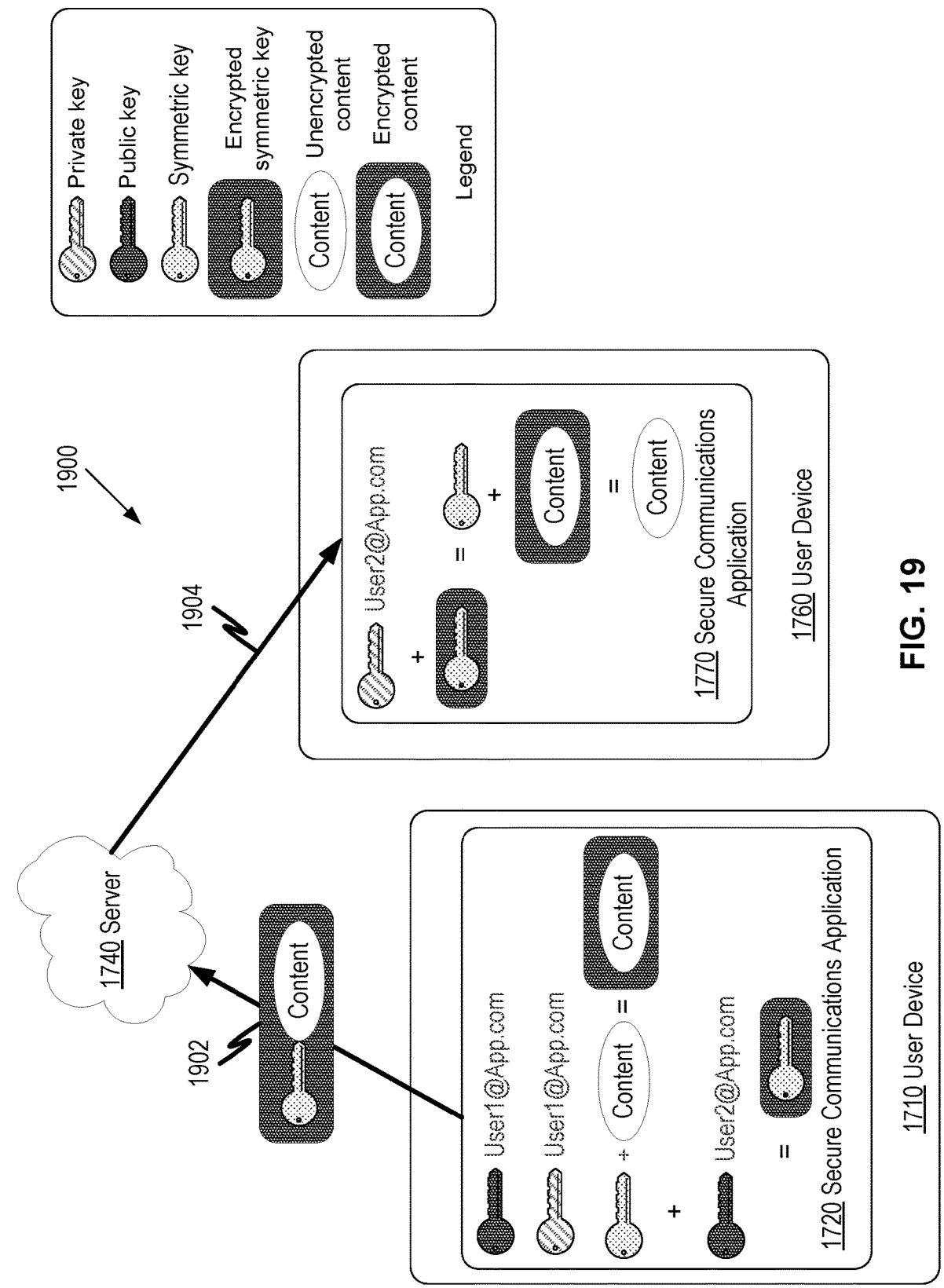
FIG. 19 is a diagram that depicts a third part of sending data from a user to another user.

FIG. 19 is a diagram that depicts a third part of sending data from the first user to the second user in an exemplary secure communications system 1900. The secure communications application 1720 signs the bundle with the user private key appropriate to the medium, e.g., service, being used, and sends the bundle in a message to the server 1740 at 1902, addressed to the appropriate user. The server 1740 cannot decrypt the message, but forwards the message at 1904 to every device on the second user's list of authorized devices, e.g., user device 1760. A user's list of authorized devices can be stored both on the user's device(s) and on the server 1740; the lists can be kept in synchronization with one another as user devices are added and removed from the list. The list on the server 1740 can be the canonical one.

Any or all of those devices, when they receive the message, check the signature of the message to ensure that it came from who it says it did, and (if it did) extract the cryptographic hash it contains, and use that to look up in their local key store which user private key to use to decrypt the symmetric key. The secure communications application 1770 then decrypts the symmetric key, and uses that, in turn, to decrypt the message contents and present them to the second user in whatever way is appropriate for the medium.

Figure 20:
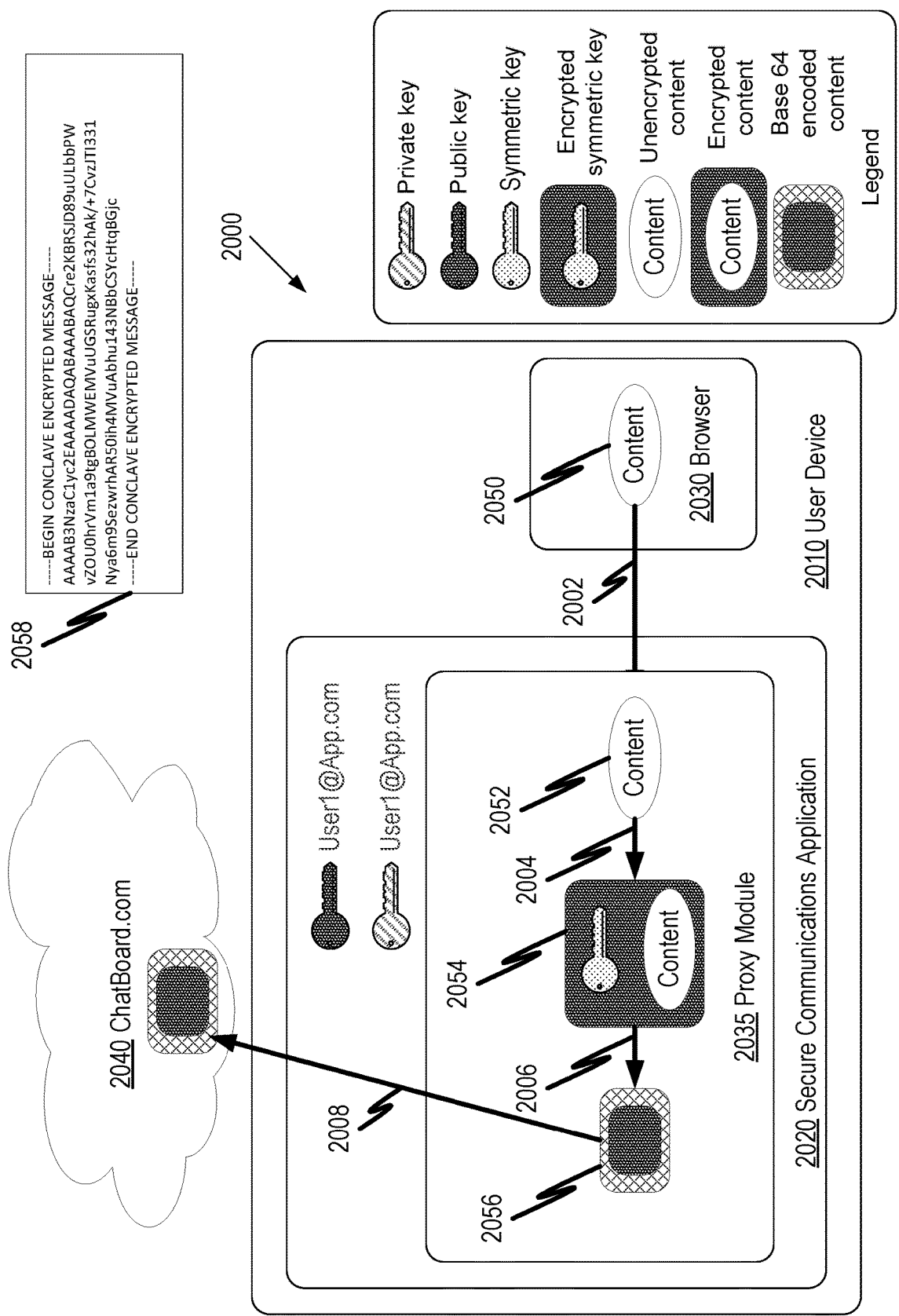
FIG. 20 is a diagram that depicts interacting with other users via a third-party website by posting content.

FIG. 20 is a diagram that depicts interacting with other users via a third-party website by posting content in an exemplary secure communications system 2000. A browser 2030 on a user device 2010 is configured to use a secure communications application 2020 as its web proxy. When the user wishes to share secure communications application-protected content on the third party website, e.g., chatboard.com 2040, all the user must do is post that information. A request to post content 2050 is intercepted at 2002 by a proxy module 2035 in the secure communications application 2020, which will determine if it is appropriate to encrypt content. If the content 2052 is to be encrypted, the secure communications application 2020 determines which secure communications application-registered site users are intended recipients of the content 2052. At 2004, the secure communications application 2020 constructs a message 2054 in a manner similar to the methods described with reference to FIGS. 17-19. The message contains the content 2052 encrypted with a new symmetric key, and a copy or copies of that symmetric key each encrypted with the public keys of all intended recipients, including that of the sending user. At 2006, the message will be converted to an alphanumeric text block 2056 via encoding such as Base64, and then will be wrapped in a fence of distinctive characters, e.g., as in fenced data block 2058. The secure communications application 2020 replaces the content of the user's submission to the website with this fenced data block and submits the request to the third-party website at 2008 on the user's behalf.

Figure 21:
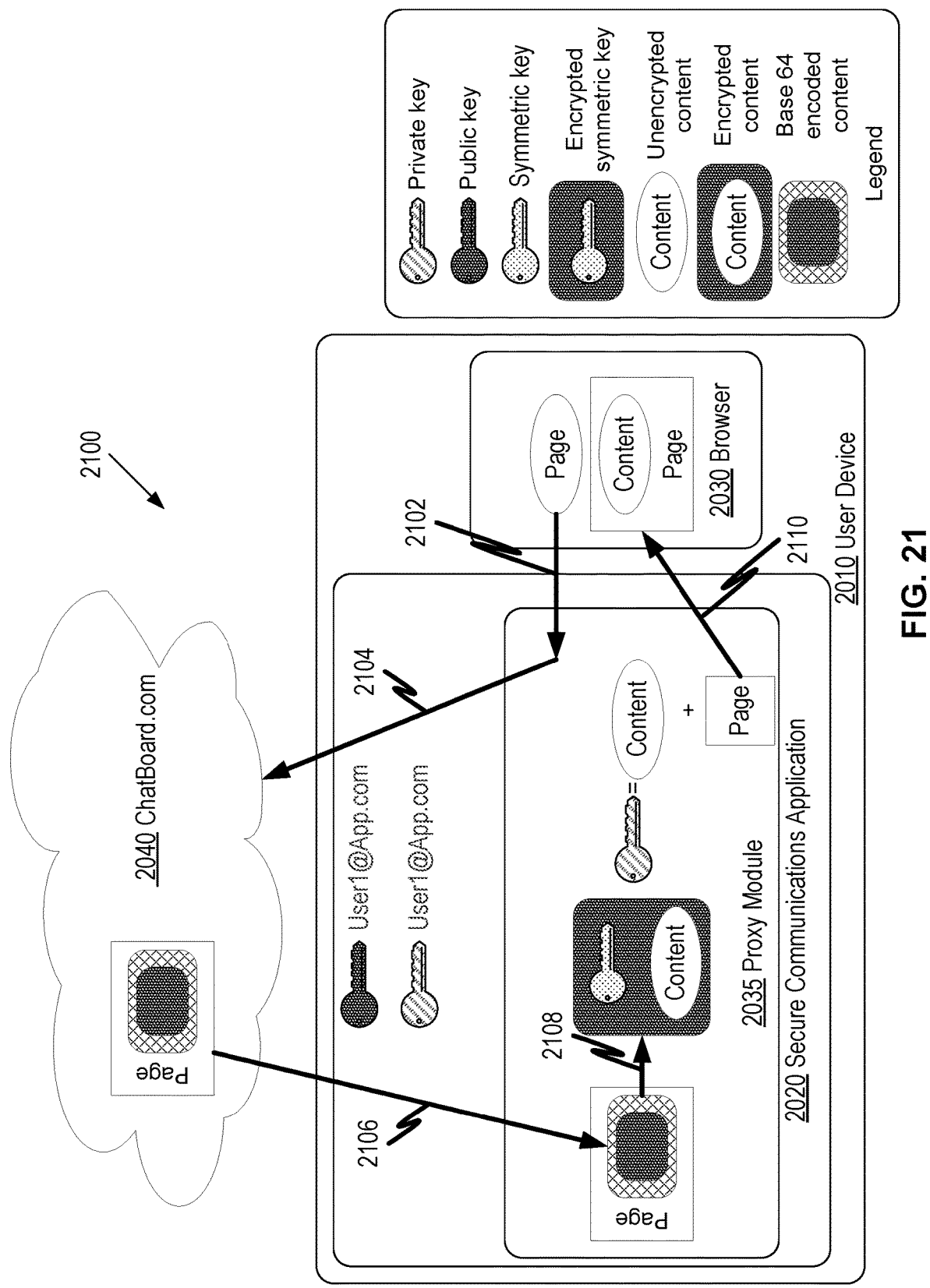
FIG. 21 is a diagram that depicts interacting with other users via a third-party website by reading content on the website.

FIG. 21 is a diagram that depicts interacting with other users via a third-party website by reading content on the website in an exemplary secure communications system 2100. At 2102, the browser 2030 sends a request to the secure communications application 2020 for the page in question. The secure communications application 2020 sends the request to the web server on behalf of the user at 2104. At 2106, results are returned from the web server, and the secure communications application 2020 inspects the contents to determine if any properly-formatted text is present in the content. If the contents contain properly-formatted text, at 2108, the secure communications application 2020 decodes the Base64 encoding of the block, locates the hash values for any keys present in the message, and compares the hashes with the locally-stored list of hash values. If the secure communications application 2020 finds a hash match, it uses the corresponding locally-stored user private key to decrypt the symmetric key from the message, decrypts the content of the message using the symmetric key, then replaces the entire message block, including the fences, with the contents of the decrypted message, before passing the response back to the browser 2030 at 2110.

Figure 22:
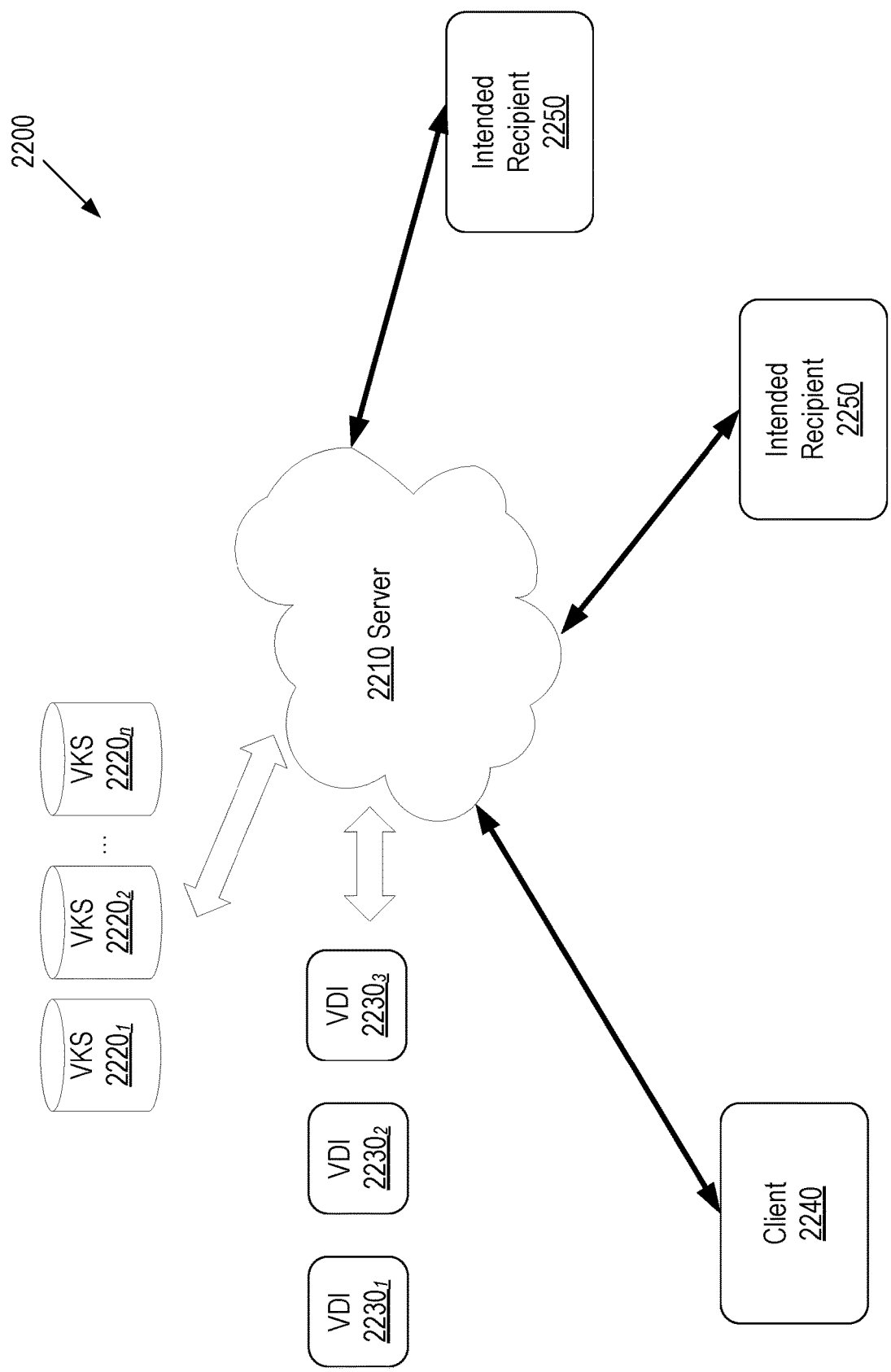
FIG. 22 is a diagram that depicts interacting with other users when a private key is not available on a local user device.

FIG. 22 is a diagram that depicts a secure communications system 2200 in which a user may not have access to his or her user device (such as user device 210) necessitating other mechanisms for secure communications. Such situations can arise when the user device is lost, stolen, or simply left behind due to security concerns (e.g., foreign travel, etc.). With the current subject matter, and with reference to diagram 2200 of FIG. 22, an arrangement can be provided in which a server (a physical or virtual compute server) 2210 can act as a certification authority and which can be accessed by one or more clients 2240 (i.e., endpoint computing device, etc.). One or more Virtual Key Stores (VKS) 22201 . . . n can also be included such that there is one VKS 2220 for each user of the system who will be using the virtualized capability. The VKS 2220 can, as an example, be implemented as small virtualized compute applications (e.g. Platform-as-a-Service nodes, containerized applications, etc.). In addition, a pool of one or more virtual compute devices 22301 . . . n can be provided. These virtual compute devices 22301 . . . n can take various forms including, for example, Virtual Desktop Infrastructure (VDI) instances or other virtualized hardware devices such as virtual cellular/mobile phones and the like.

The communication system 2200 can provide many of the same or identical functionality as described in other variations above and can, additionally provide virtual-device capability. In particular, the communication system 2200 can be configured to contain a certificate authority server 2210 (either as a discrete server or as a service running on the real or virtual hardware that is already being used to run other communications services as provided below). The certificate authority server 2210 can generate a UUID or other sufficiently-long secret value to use as a Pre-Shared Key (PSK) among virtual devices within the communications system 2300.

The communications system 2200 can act as on-demand virtual-machine and virtual-application deployment system in such a way that it can instantiate VKS nodes 2220i . . . n and VDI or other virtual user platform nodes 2230i . . . n as required.

In operation, a user, wishing to use the current virtual capabilities, can create an account with a server as described above, or can log in to an existing account on the client 2240, and indicate that a VKS 2220 will be used.

The server 2210 can, in response to such a request/login, instantiate a new VKS node 2220. The VKS node 2220 can be instantiated, for example, by a Virtual-Resource Deployment System. A cryptographically-calculated URL (a string comprising the user's login ID concatenated with the generated PSK, which is then hashed using a cryptographically-strong algorithm, such as SHA256) can be used that is prepended to a provider-specific URL base. For instance, a user called "bob@company.com", using the current system with the PSK "afc0376a-74e0-4d82-9259-139727a37211", configured to use Cloud Foundry (cfapps.io) for its VKS instances, could have a VKS URL of: "c20ff35f6e8ad39-df68bda02b974afb79c7eefef89fef93b7912e3872ed5e82e.cfapps.io"

The user can select a PIN or other sufficiently-strong personal identification method (e.g. password, multi-factor authentication (MFA) device, etc.) that will be used to identify such user to the VKS node 2220 in the future.

The VKS node 2220 is then issued a cryptographic identity certificate signed by the Certification Authority server 2210. If the VKS node 2210 is the user's first device to be registered with the communications system 2200, the communications system 2200 can generate keypairs for itself and the user as any other first user device does in the communication systems described above. If the user has one or more existing devices already registered with the communications system 2200, the VKS node 220 can generate its own device keypair, and then initiate a request to receive the user's private key(s) via a same or similar mechanism as describe above.

A system administrator can determine that a pool of VDI instances 2230 can be made available to users to use to access the service from one or more client 2240. The VDI instances 2230 can be pre-configured to contain various applications (e.g. Mattermost) that the user might wish to use.

The communications system 2200 can instantiate a pool of VDI instances 2230, and configure each virtual machine in the pool with the cryptographic identity certificate of the certification authority by server 2210 as well as the corresponding PSK.

The user, via the client 2240, can reserve a VDI instance 2230 from the pool, and connect to it using a web browser on the client 2240.

Once connected to the VDI instance 2230, the user can access various applications installed on such instance 2230. Such applications can require the user to provide its User ID and his PIN/password/MFA value, as appropriate. Using the User ID and the PSK that it was configured with at build time, the application calculates the cryptographic hash for that user and builds the URL for that particular user's VKS 2220. The application then establishes a connection, via HTTPS, to the VKS node 2220, and verifies that the cryptographic identity certificate presented by the VKS node 2230 has been signed by the CA 2210 that matches the cryptographic identity certificate that was configured on the VDI instance 2230 at build time.

Having thus validated that the VKS node 2230 is valid, the application can establish a persistent connection to the VKS 2220 (e.g. via a websocket), and transmits the user's PIN or other identifier(s) to the VKS 2220. The VKS 2220 can then use the provided personal identification value to unlock its local keystore (as described above).

The VKS 2220 then uses the information in the now-unlocked keystore to establish a connection to the server 2210, as well as to the communication service (e.g. Mattermost) the user is using.

The VKS 2220 can then act as a cryptographic proxy, on behalf of the application running on the VDI instance 2230, such that information being sent to the communication service is processed as by any other connected device, and encrypted for transmission to its intended recipients 2250. Further, as communications are received from the communication service, they are inspected to determine whether they contain encrypted information, and, if so, decrypted in place before being returned to the application as described above.

Figure 23:
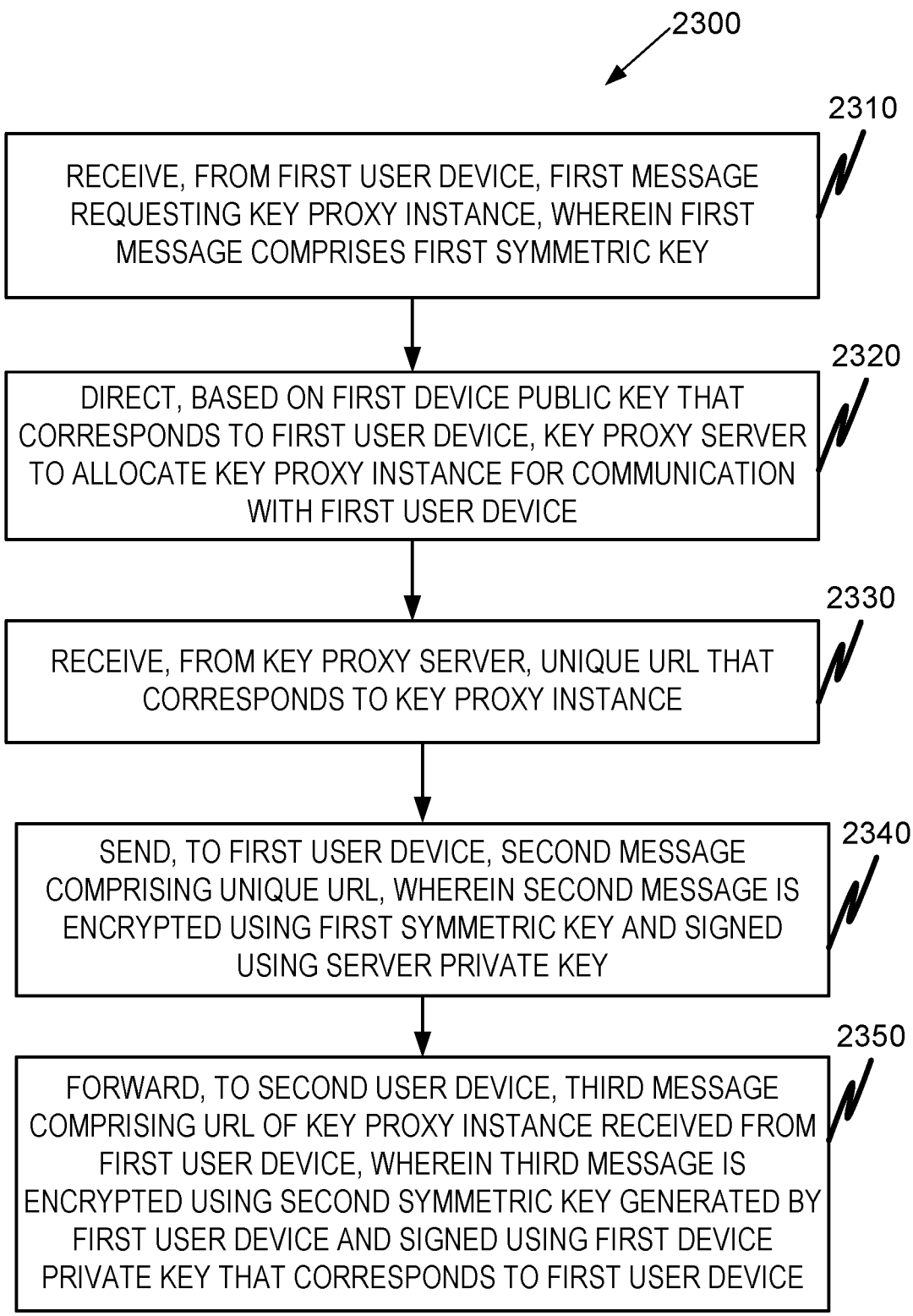
FIG. 23 is a flow diagram 2200 depicting a method for automatically disseminating a private key.

FIG. 23 is a flow diagram 2300 depicting a method for automatically disseminating a private key. At 2310, a first message requesting a key proxy instance is received from a first user device. The first message comprises a first symmetric key. At 2320, a key proxy server is directed to allocate a key proxy instance for communication with the first user device based on a first device public key that corresponds to the first user device. A unique URL corresponding to the key proxy instance is received from the key proxy server at 2330. A second message comprising the unique URL is sent to the first user device at 2340. The second message is encrypted using the first symmetric key and signed using a server private key. At 2350, a third message comprising the URL of the key proxy instance is received from the first user device and forwarded to a second user device. The third message is encrypted using the second symmetric key and signed using a first device private key that corresponds to the first user device.

Figure 24:
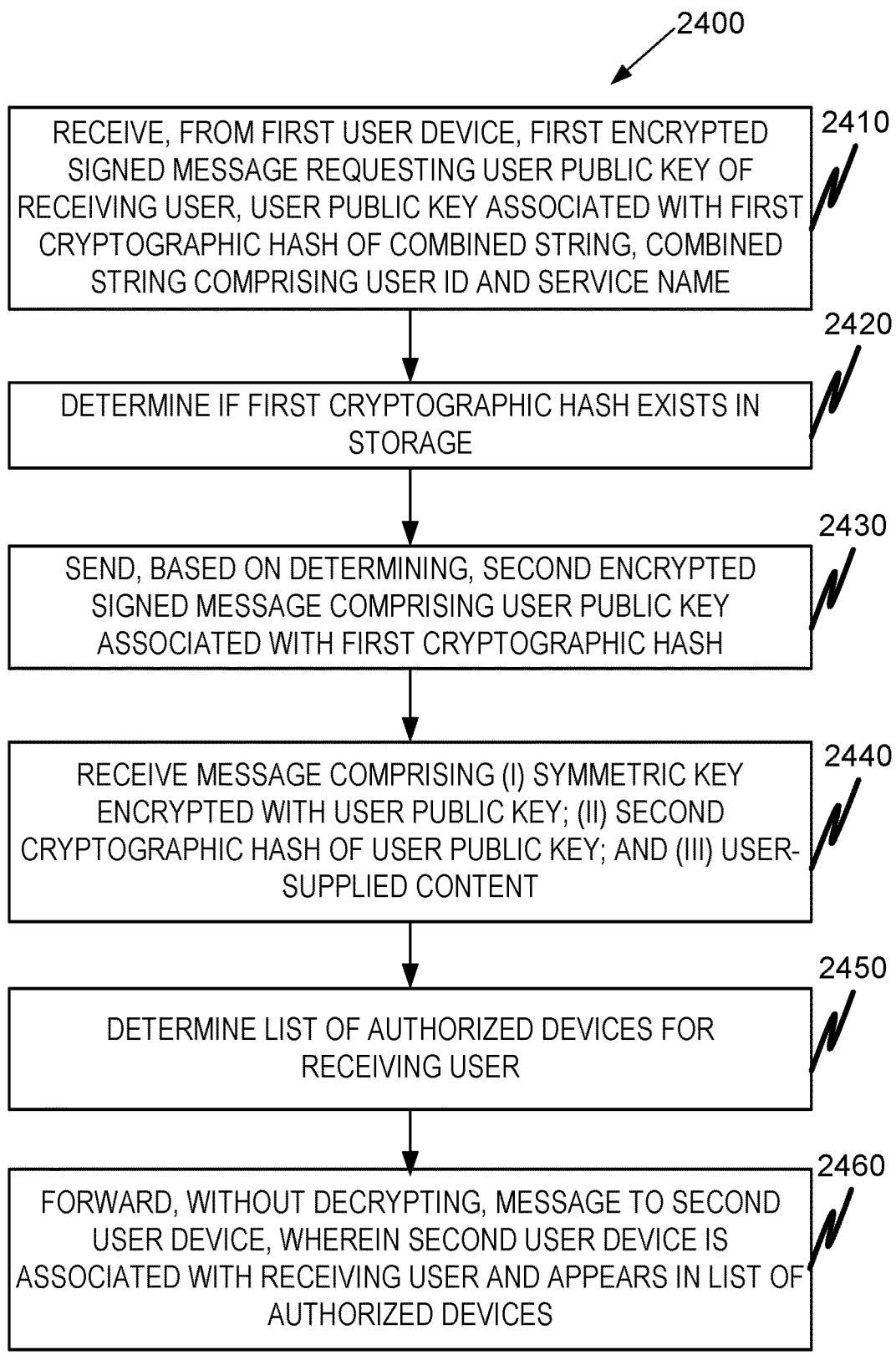
FIG. 24 is a flow diagram depicting a method for facilitating communication between users.

FIG. 24 is a flow diagram 2400 depicting a method for facilitating communication between users is presented. At 2410, a first encrypted signed message requesting a user public key of a receiving user is received from a first user device. The user public key is associated with a first cryptographic hash of a combined string. The combined string comprises a user ID and a service name. At 2420, whether the first cryptographic hash exists in storage is determined. A second encrypted signed message comprising the user public key associated with the first cryptographic hash is sent based on the determining at 2430. At 2440, a message comprising (i) a symmetric key encrypted with the user public key; (ii) a second cryptographic hash of the user public key; and (iii) user-supplied content is received. At 2450, a list of authorized devices for the receiving user is determined. The message is forwarded, without decrypting, to a second user device at 2360. The second user device is associated with the receiving user and appears in the list of authorized devices.

Figure 25:
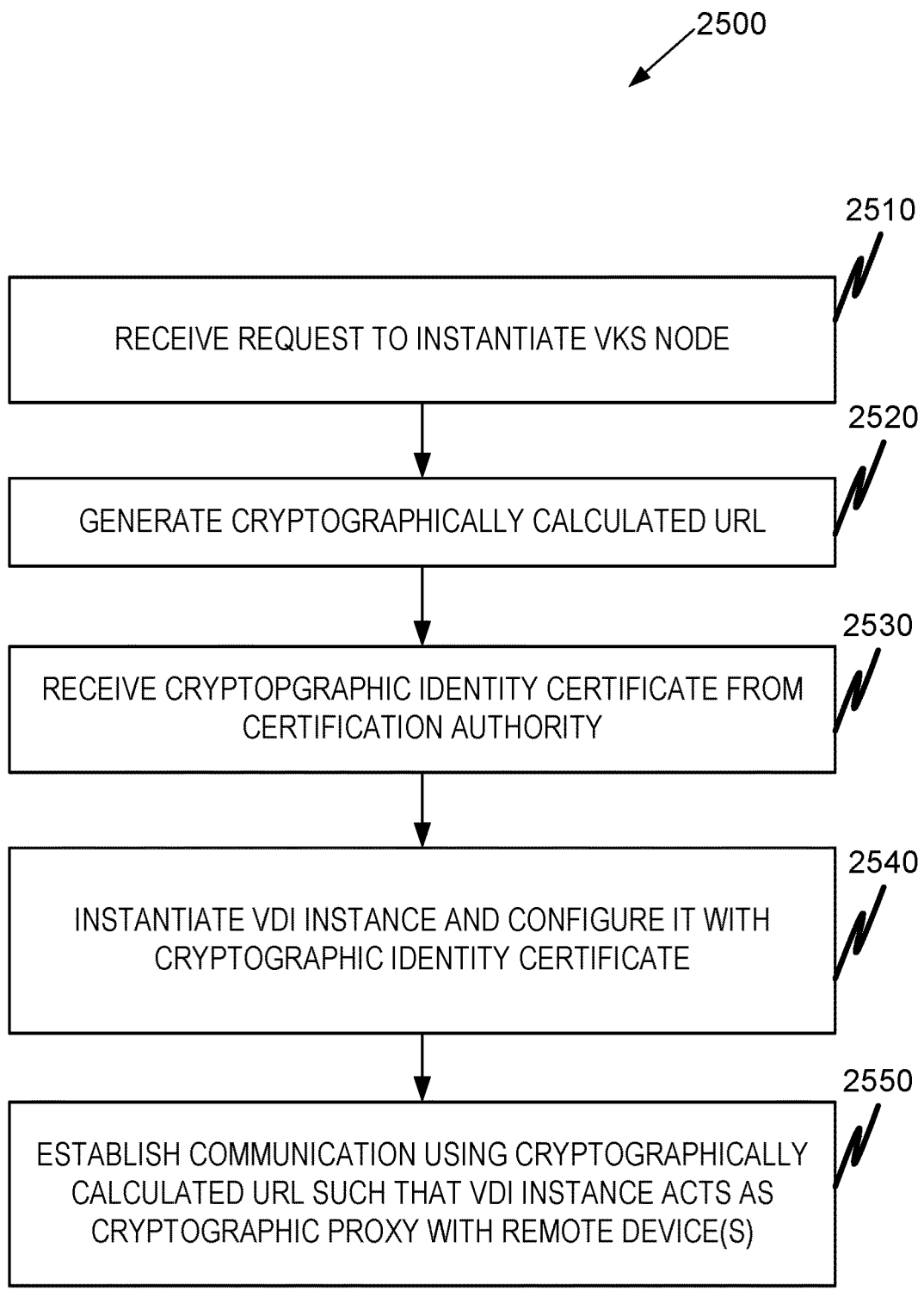
FIG. 25 is a flow diagram depicting a method for facilitating communication between users when a local private key is not available on a local user device.

FIG. 25 is a flow diagram 2500 depicting a method for facilitating communication between users when a local private key is not available on a local user device. At 2510, a request is received from a client computing device to instantiate a virtual key store (VKS) node. Thereafter, and in response to the request, at 2520, a cryptographically calculated uniform resource locator (URL) is generated. Further, at 2530, a cryptographic identity certificate is received from a certification authority server. Using this cryptographic identity certificate, at 2540, a virtual desktop infrastructure (VDI) instance is instantiated and configured with the cryptographic identity certificate. Subsequently, at 2550 and using the generated cryptographically calculated URL, communication is established between the client computing device and the VDI instance such that the VDI instance acts as a cryptographic proxy with at least one remote computing device.

The systems and methods presented herein provide several advantageous features. Ephemeral, single-use-only platform as a service (PaaS) instances are used for key exchange in a way that guarantees that no user private key information traverses the primary system servers, is not commingled with any other user's private key information, and exists on a user's personally-controlled devices for the few moments it takes to ensure successful transfer to another device owned by the user.

The storing and retrieving users' various public keys by way of referencing a cryptographic hash of the user's account name and associated service ensures that there is no record on the system server of the names of accounts a user has associated with the service. Even if the system server becomes compromised, a hacker could not associate which third-party service accounts are associated with which secure communications application user accounts.

The combination of unique device key pairs with unique user-account key pairs allows private keys to be safely transferred from one device to another across the open internet without risk of compromise.

The use of familiar workflows such as "friend-request"-style interactions to facilitate key exchange between users allows for cryptographic integrity to be established without interfering with the user's ease-of-use.

Using a native application running on a device as a selective web proxy so that traffic being sent to publicly-accessible websites from the user's browser can be intercepted and encrypted prior to the traffic leaving the user's computer. Similarly, content being downloaded to the user's browser can be inspected for encrypted content and decrypted in-stream, so that the user's experience is the same as if no encryption were in use.

The use of a historical key-store, which retains previous versions of a user's private keys, but encrypted with the device's current key, allows a user to access old content that was encrypted using previous keys, while allowing keys to be updated and changed at any time to prevent compromise through loss. In addition, the use of cryptographic hashes of encryption keys in the key store, and accompanying transmitted/stored encrypted data, indicate which key out of a set of many should be used for decrypting a given data set.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

It is claimed:

1. A method for establishing secure communications comprising:
    sending, by a client computing device to a server, a request to instantiate a virtual key store (VKS) node, the server instantiating the VKS node in response to receiving the request and generating a cryptographically calculated uniform resource locator (URL) after instantiation of the VKS node; and
    establishing, in response to the request and using the generated cryptographically calculated URL, communications between the client computing device and an instance such that the instance acts as a cryptographic proxy with at least one remote computing device such that information being sent by the application is encrypted at the VKS node and that encrypted information being sent by the at least one remote computing device is decrypted at the VKS node;
    wherein:
        the VKS node receives a cryptographic identity certificate from a certification authority server; and
        the instance is instantiated and configured with the cryptographic identity certificate.

2. The method of claim 1, wherein the VKS node is a Platform-as-a-Service node.

3. The method of claim 1, wherein the VKS node is a containerized application.

4. The method of claim 1, wherein the instance is executed by a virtual compute server.

5. The method of claim 1, wherein the certification authority is executed on a physical server.

6. The method of claim 1, wherein the certification authority is executed by a virtual compute server.

7. The method of claim 1 further comprising:
    generating, by the certification authority server, a pre-shared key (PSK).

8. The method of claim 7, wherein the cryptographically calculated URL is generated by:
    hashing user credentials with the PSK.

9. The method of claim 8 further comprising:
    generating, by the VKS node, keypairs associated with the client computing device.

10. The method of claim 1, wherein a pool of instances are instantiated and one of the instances is reserved.

11. A system for establishing secure communications comprising:
    at least one data processor; and
    memory storing instructions which, when executed by the at least one data processor, result in operations comprising:
        sending, by a client computing device to a server, a request to instantiate a virtual key store (VKS) node, the server instantiating the VKS node in response to receiving the request and generating a cryptographically calculated uniform resource locator (URL) after instantiation of the VKS node; and
        establishing, in response to the request and using the generated cryptographically calculated URL, communications between the client computing device and an instance such that the instance acts as a cryptographic proxy with at least one remote computing device such that information being sent by the application is encrypted at the VKS node and that encrypted information being sent by the at least one remote computing device is decrypted at the VKS node;

wherein:
the VKS node receives a cryptographic identity certificate from a certification authority server; and
the instance is instantiated and configured with the cryptographic identity certificate.

12. The system of claim 11, wherein the VKS node is a Platform-as-a-Service node.

13. The system of claim 11, wherein the VKS node is a containerized application.

14. The system of claim 11, wherein the instance is executed by a virtual compute server.

15. The system of claim 11, wherein the certification authority is executed on a physical server.

16. The system of claim 11, wherein the certification authority is executed by a virtual compute server.

17. The system of claim 11, wherein the operations further comprise:
generating, by the certification authority server, a pre-shared key (PSK).

18. The method of claim 7, wherein:
the cryptographically calculated URL is generated by hashing user credentials with the PSK; and
the operations further comprise generating, by the VKS node, keypairs associated with the client computing device.

19. The system of claim 11, wherein a pool of instances are instantiated and one of the instances is reserved.

20. A non-transitory computer program product for establishing secure communications storing instructions, which when executed by at least one computing device, result in operations comprising:
sending, by a client computing device to a server, a request to instantiate a virtual key store (VKS) node, the server instantiating the VKS node in response to receiving the request and generating a cryptographically calculated uniform resource locator (URL) after instantiation of the VKS node; and
establishing, in response to the request and using the generated cryptographically calculated URL, communications between the client computing device and an instance such that the instance acts as a cryptographic proxy with at least one remote computing device such that information being sent by the application is encrypted at the VKS node and that encrypted information being sent by the at least one remote computing device is decrypted at the VKS node;
wherein:
the VKS node receives a cryptographic identity certificate from a certification authority server; and
the instance is instantiated and configured with the cryptographic identity certificate.

* * * * *